(12) United States Patent
Leo John et al.

(10) Patent No.: US 11,334,223 B1
(45) Date of Patent: May 17, 2022

(54) USER INTERFACE FOR DATA ANALYTICS SYSTEMS

(71) Applicant: DataChat.ai, Madison, WI (US)

(72) Inventors: Rogers Jeffrey Leo John, Middleton, WI (US); Jignesh Patel, Madison, WI (US); Robert Konrad Claus, Madison, WI (US)

(73) Assignee: DataChat.ai, Madison, WI (US)

( * ) Notice: Subject to any disclaimer, the term of this patent is extended or adjusted under 35 U.S.C. 154(b) by 0 days.

(21) Appl. No.: 17/443,302

(22) Filed: Jul. 23, 2021

Related U.S. Application Data

(60) Provisional application No. 63/201,140, filed on Apr. 14, 2021.

(51) Int. Cl.
*G06F 3/0482* (2013.01)
*G06F 40/174* (2020.01)
*G06F 3/0485* (2022.01)

(52) U.S. Cl.
CPC .......... *G06F 3/0482* (2013.01); *G06F 3/0485* (2013.01); *G06F 40/174* (2020.01)

(58) Field of Classification Search
CPC .............................. G06F 3/0482; G06F 3/0485
See application file for complete search history.

(56) References Cited

U.S. PATENT DOCUMENTS

| | | | |
|---|---|---|---|
| 5,682,539 A | 10/1997 | Conrad et al. | |
| 6,421,071 B1 * | 7/2002 | Harrison | G01R 31/31935 715/787 |
| 9,665,662 B1 | 5/2017 | Gautam et al. | |
| 11,157,704 B2 | 10/2021 | Patel et al. | |
| 2005/0091036 A1 | 4/2005 | Shackleton et al. | |
| 2005/0273336 A1 | 12/2005 | Chang et al. | |
| 2009/0119095 A1 | 5/2009 | Beggelman et al. | |
| 2011/0119047 A1 | 5/2011 | Ylonen | |

(Continued)

FOREIGN PATENT DOCUMENTS

WO  2018009369 A1  1/2018

OTHER PUBLICATIONS

Whitty, "The Chomsky Hierarchy" London South Bank University, Touring Turing, Rewley House, Jul. 2012, 13 pp.

(Continued)

*Primary Examiner* — Asher D Kells
(74) *Attorney, Agent, or Firm* — Shumaker & Sieffert, P.A.

(57) ABSTRACT

A device comprising a processor and a memory may be configured to perform various aspects of the techniques described in this disclosure. The processor may present, via a first portion of a user interface, an interactive text box in which a user may enter the data indicative of the current input, present, via a second portion of the user interface, an interactive log of previous inputs entered prior the current input, and present, via a third portion of the user interface, a graphical representation of result data obtained responsive to the data indicative of the current input. The second portion of the user interface and the third portion of the user interface may be separately scrollable but coupled such that interactions in either the second portion of the user interface or the third portion of the user interface synchronize the second portion of the user interface and the third portion of the user interface. The memory may store the data indicative of the current input.

19 Claims, 19 Drawing Sheets

(56) References Cited

U.S. PATENT DOCUMENTS

| | | |
|---|---|---|
| 2012/0016678 A1 | 1/2012 | Gruber et al. |
| 2012/0065960 A1 | 3/2012 | Iwama et al. |
| 2013/0332481 A1 | 12/2013 | Lau et al. |
| 2015/0331850 A1 | 11/2015 | Ramish |
| 2015/0339376 A1 | 11/2015 | Wieweg et al. |
| 2016/0162473 A1 | 6/2016 | Cogley et al. |
| 2016/0179934 A1 | 6/2016 | Stubley et al. |
| 2017/0116982 A1 | 4/2017 | Gelfenbeyn et al. |
| 2017/0124988 A1* | 5/2017 | Mitsui .................. G06F 3/04855 |
| 2019/0138329 A1* | 5/2019 | Berns ..................... G10L 15/22 |
| 2020/0356253 A1* | 11/2020 | Yoshimoto .......... G06F 3/04883 |

OTHER PUBLICATIONS

Richardson, John H. "AI Chatbots Try to Schedule Meetings without Enraging Us" Wired.com, available at https://www.wired.com/story/xai-meeting-ai-chatbot/ (last accessed Jun. 13, 2019), May 24, 2018, 9 pp.

U.S. Appl. No. 17/443,304, filed Jul. 23, 2021, naming inventors Leo John et al.

* cited by examiner

USER INTERFACE FOR DATA ANALYTICS SYSTEMS

This application claims the priority to U.S. Provisional Application No. 63/201,140, entitled "USER INTERFACE FOR DATA ANALYTICS SYSTEMS," filed Apr. 14, 2021, the contents of which are hereby incorporated by reference in their entirety.

TECHNICAL FIELD

This disclosure relates to computing and data analytics systems, and more specifically, user interfaces for data analytics systems.

BACKGROUND

Data analytics systems are increasingly using natural language processing to facilitate interactions by users who are unaccustomed to formal, or in other words, structured database languages. Natural language processing generally refers to a technical field in which computing devices process user inputs provided by users via conversational interactions using human languages. For example, a device may prompt a user for various inputs, present clarifying questions, present follow-up questions, or otherwise interact with the user in a conversational manner to elicit the input. The user may likewise enter the inputs as sentences or even fragments, thereby establishing a simulated dialog with the device to specify one or more intents (which may also be referred to as "tasks") to be performed by the device.

Natural language processing may allow users unaccustomed with formal (or in other words, structured) database languages (such as a structured query language—SQL, or other structured database languages) to perform data analytics without having a deep knowledge of such formal database languages. While natural language processing may facilitate such data analytics by users unaccustomed with formal database languages, the user interface associated with natural language processing may, in some instances, be cluttered and difficult to understand due to the conversational nature of natural language processing. Moreover, the conversation resulting from natural language processing may distract certain users from the underlying data analytics result, thereby possibly detracting from the benefits of natural language processing in the context of data analytics.

In addition, while natural language processing may allow users unaccustomed with structured database languages, natural language processing may still require complicated phrasings (which may also be referred to as "utterances") to produce various data analytic results. Such complicated phrasings are difficult to learn and may not produce the desired results when improperly entered, thereby again detracting from the benefits of natural language processing in the context of data analytics.

SUMMARY

In general, this disclosure describes techniques for a user interface that better facilitates user interaction with data analytic systems that employ natural language processing. Rather than present a cluttered user interface in which users struggle to understand the results produced by the data analytic system, various aspects of the techniques described in this disclosure may allow for a seamless integration of natural language processing with data analytics in a manner that results in a cohesive user interface by which users may intuitively understand the results produced by the data analytics system.

The user interface enabled by way of the techniques described in this disclosure may provide, via a first portion of the user interface (e.g., a first frame), an interactive text box that allows users to express intents via natural language. The user interface may also include a second portion (e.g., a second frame) that presents a historical log of previous inputs and responses (along with visual indications representative of such responses and/or results) from the natural language processing engine, which allows the user to quickly assess how the results and/or responses were derived. The user interface may also include a third portion that presents a graphical representation of the results provided responsive to any inputs. In each instance, the first, second, and third portions do not overlap or otherwise obscure data that would otherwise be relevant to the user at a particular point in time, thereby allowing the user to better comprehend the results provided in the third portion of the user interface along with the historical log presented by the second portion of the user interface.

In addition, the third portion of the user interface and the second portion of the user interface may be separately scrollable to accommodate how different users understand different aspects of the results. Similar to human psychology in which predominantly right-brain users respond to creative and artistic stimuli and predominant left-brain users respond to logic and reason, the user interface divides the representation of the result into right-brain stimuli (e.g., graphical representation of the results in the third portion of the user interface) and left-brain stimuli (e.g., a historical log explaining how the results were logically derived in the second portion of the user interface). Regardless of the users predominance of right-brain or left-brain, the user interface may synchronize the third portion of the user interface with the second portion of the user interface responsive to interactions with either the second portion of the user interface or the third portion of the user interface, thereby facilitating data analytics regardless of the user's predominance with regard to right-brain or left-brain stimuli.

In this respect, various aspect of the techniques described in this disclosure may facilitate better interactions with respect to performing data analytics while also removing clutter and other distractions that may distract from understanding results provided by data analytic systems. As a result, data analytic systems may operate more efficiently, as users are able to more quickly understand the results without having to enter additional inputs and/or perform additional interactions with the data analytic system to understand presented results. By potentially reducing such inputs and/or interactions, the data analytic system may conserve various computing resources (e.g., processing cycles, memory space, memory bandwidth, etc.) along with power consumption consumed by such computing resources, thereby improving operation of data analytic systems themselves.

Moreover, various aspects of the techniques described in this disclosure may allow users to interface with a graphical representation of a format for a visual representation of the underlying data (which may be stored as a table or other data structure having multiple-dimensions, and as a result, the data may be referred to a multi-dimensional data). Rather than enter cumbersome utterances by which to define, via natural language, the visual representation of the multi-dimensional data, the user may interface, via a user interface, with a graphical representation (e.g., a wire-frame) of a format for such visual representations of the multi-dimensional data (e.g., a chart, bubble chart, graph, etc.).

Furthermore, the user interface with which the user may interact with the graphical representation of the format for the visual representations of the multi-dimensional data may also provide data representative of an input (e.g., the complicated utterance or other natural language input) that the user would have entered to generate the visual representation of the multi-dimensional data. This data representative of the input may thereby enable the user, who may be more right-brain predominant, to learn the less visual natural language input by which such visual representations may be generated.

As such, various aspects of the techniques described in this disclosure may facilitate generation of visual representations of the multi-dimensional data via graphical representations of the format for such visual representations, which may enable more visual (e.g., right-brain predominant) users to create complicated visual representations of the multi-dimensional data that would otherwise be difficult and time consuming. By reducing interactions while also explaining the corresponding natural language input along side the visual representation of the mulit-dimensional data, the data analytics system may again operate more efficiently, as users are able to more quickly understand the results without having to enter additional inputs and/or perform additional interactions with the data analytic system to in an attempt to visualize the multi-dimensional data (which may also be referred to as a "result"). By potentially reducing such inputs and/or interactions, the data analytic system may conserve various computing resources (e.g., processing cycles, memory space, memory bandwidth, etc.) along with power consumption consumed by such computing resources, thereby improving operation of data analytic systems themselves.

In one aspect, the techniques are directed to a device configured to process data indicative of a current input, the device comprising: one or more processors configured to: present, via a first portion of a user interface, an interactive text box in which a user may enter the data indicative of the current input; present, via a second portion of the user interface, an interactive log of previous inputs entered prior the current input; and present, via a third portion of the user interface, a graphical representation of result data obtained responsive to the data indicative of the current input, wherein the second portion of the user interface and the third portion of the user interface are separately scrollable but coupled such that interactions in either the second portion of the user interface or the third portion of the user interface synchronize the second portion of the user interface and the third portion of the user interface; and a memory configured to store the data indicative of the current input.

In another aspect, the techniques are directed to a method of processing data indicative of a current input, the method comprising: presenting, via a first portion of a user interface, an interactive text box in which a user may enter the data indicative of the current input; presenting, via a second portion of the user interface, an interactive log of previous inputs entered prior the current input; and presenting, via a third portion of the user interface, a graphical representation of result data obtained responsive to the data indicative of the current input, wherein the second portion of the user interface and the third portion of the user interface are separately scrollable but coupled such that interactions in either the second portion of the user interface or the third portion of the user interface synchronize the second portion of the user interface and the third portion of the user interface.

In another aspect, the techniques are directed to a non-transitory computer-readable storage medium having instructions stored thereon that, when executed, cause one or more processors to: present, via a first portion of a user interface, an interactive text box in which a user may enter the data indicative of the current input; present, via a second portion of the user interface, an interactive log of previous inputs entered prior the current input; and present, via a third portion of the user interface, a graphical representation of result data obtained responsive to the data indicative of the current input, wherein the second portion of the user interface and the third portion of the user interface are separately scrollable but coupled such that interactions in either the second portion of the user interface or the third portion of the user interface synchronize the second portion of the user interface and the third portion of the user interface.

In another aspect, the techniques are directed to a device configured to perform data analytics, the device comprising: a memory configured to store multi-dimensional data; and one or more processors configured to: present, via a user interface, a graphical representation of a format for visually representing the multi-dimensional data; receive, via the user interface, a selection of an aspect of one or more aspects of the graphical representation of the format for visually representing the multi-dimensional data; receive, via the user interface and for the aspect of the one or more aspects of the graphical representation of the format for visually representing the multi-dimensional data, an indication of a dimension of the multi-dimensional data; associate the dimension to the aspect to generate a visual representation of the multi-dimensional data; and present, via the user interface, the visual representation of the multi-dimensional data.

In another aspect, the techniques are directed to a method of performing data analytics, the method comprising: presenting, via a user interface, a graphical representation of a format for visually representing multi-dimensional data; receiving, via the user interface, a selection of an aspect of one or more aspects of the graphical representation of the format for visually representing the multi-dimensional data; receiving, via the user interface and for the aspect of the one or more aspects of the graphical representation of the format for visually representing the multi-dimensional data, an indication of a dimension of the multi-dimensional data; associating the dimension to the aspect to generate a visual representation of the multi-dimensional data; and presenting, via the user interface, the visual representation of the multi-dimensional data.

In another aspect, the techniques are directed to a non-transitory computer-readable storage medium having instructions stored thereon that, when executed, cause one or more processors to: present, via a user interface, a graphical representation of a format for visually representing multi-dimensional data; receive, via the user interface, a selection of an aspect of one or more aspects of the graphical representation of the format for visually representing the multi-dimensional data; receive, via the user interface and for the aspect of the one or more aspects of the graphical representation of the format for visually representing the multi-dimensional data, an indication of a dimension of the multi-dimensional data; associate the dimension to the aspect to generate a visual representation of the multi-dimensional data; and present, via the user interface, the visual representation of the multi-dimensional data.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
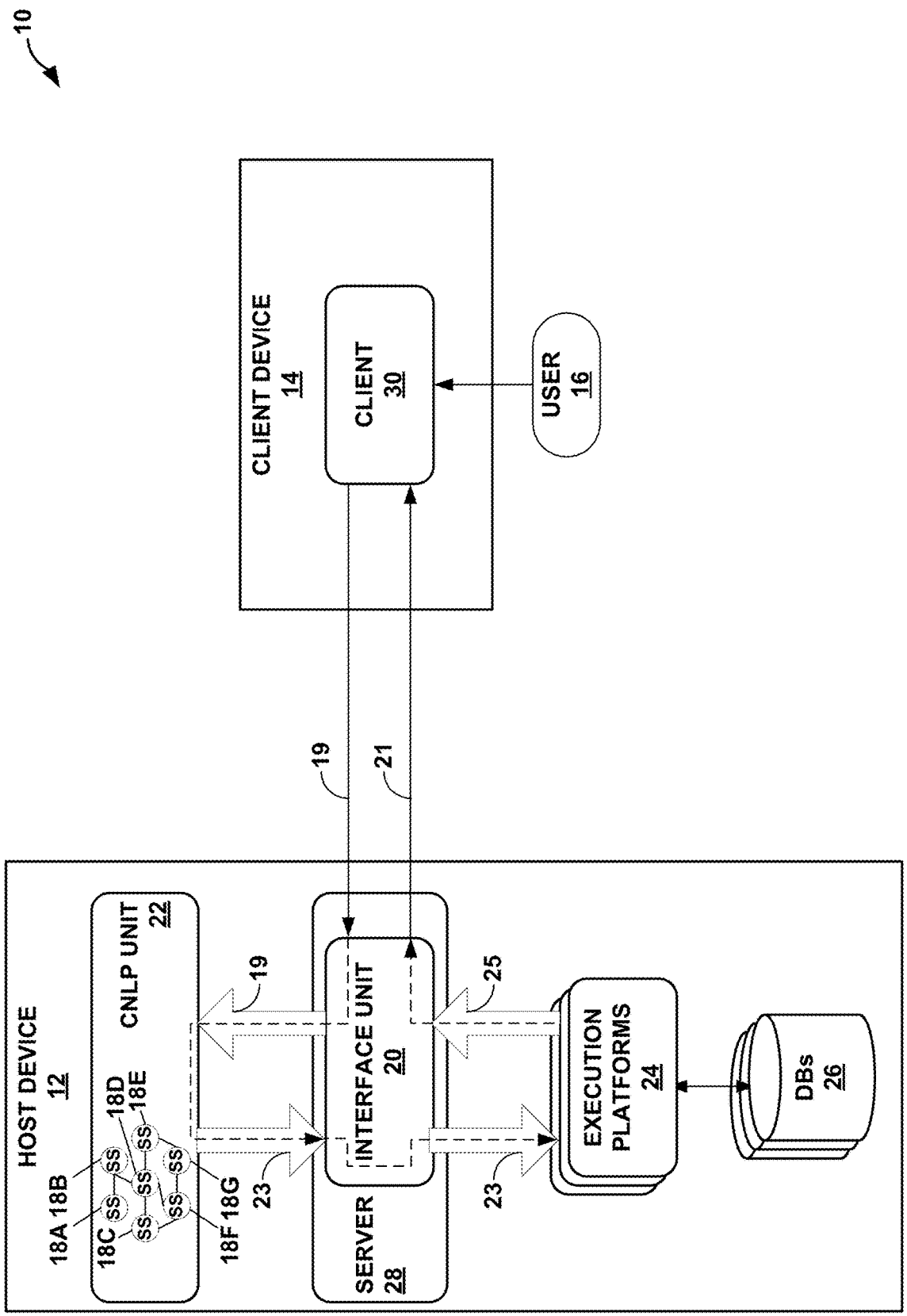
FIG. 1 is a block diagram illustrating a system that may perform various aspects of the techniques described in this disclosure.

FIG. 1 is a diagram illustrating a system 10 that may perform various aspects of the techniques described in this disclosure to enable more cohesive user interfaces for data analytic systems. As shown in the example of FIG. 1, system 10 includes a host device 12 and a client device 14. Although shown as including two devices, i.e., host device 12 and client device 14 in the example of FIG. 1, system 10 may include a single device that incorporates the functionality described below with respect to both of host device 12 and client device 14, or multiple clients 14 that each interface with one or more host devices 12 that share a mutual database hosted by one or more of the host devices 12.

Host device 12 may represent any form of computing device capable of implementing the techniques described in this disclosure, including a handset (or cellular phone), a tablet computer, a so-called smart phone, a desktop computer, and a laptop computer to provide a few examples. Likewise, client device 14 may represent any form of computing device capable of implementing the techniques described in this disclosure, including a handset (or cellular phone), a tablet computer, a so-called smart phone, a desktop computer, a laptop computer, a so-called smart speaker, so-called smart headphones, and so-called smart televisions, to provide a few examples.

As shown in the example of FIG. 1, host device 12 includes a server 28, a CNLP unit 22, one or more execution platforms 24, and a database 26. Server 28 may represent a unit configured to maintain a conversational context as well as coordinate the routing of data between CNLP unit 22 and execution platforms 24.

Server 28 may include an interface unit 20, which may represent a unit by which host device 12 may present one or more interfaces 21 (which may also be referred to as "user interfaces 21") to client device 14 in order to elicit data 19 indicative of an input and/or present results 25. Data 19 may be indicative of speech input, text input, image input (e.g., representative of text or capable of being reduced to text), or any other type of input capable of facilitating a dialog with host device 12. Interface unit 20 may generate or otherwise output various interfaces 21, including graphical user interfaces (GUIs), command line interfaces (CLIs), or any other interface by which to present data or otherwise provide data to a user 16. Interface unit 20 may, as one example, output a chat interface 21 in the form of a GUI with which the user 16 may interact to input data 19 indicative of the input (i.e., text inputs in the context of the chat server example). Server 28 may output the data 19 to CNLP unit 22 (or otherwise invoke CNLP unit 22 and pass data 19 via the invocation).

CNLP unit 22 may represent a unit configured to perform various aspects of the CNLP techniques described in this disclosure. CNLP unit 22 may maintain a number of interconnected language sub-surfaces (shown as "SS") 18A-18G ("SS 18"). Language sub-surfaces 18 may collectively represent a language, while each of the language sub-surfaces 18 may provide a portion (which may be different portions or overlapping portions) of the language. Each portion may specify a corresponding set of syntax rules and strings permitted for the natural language with which user 16 may interface to enter data 19 indicative of the input. CNLP unit 22 may perform CNLP, based on the language sub-surfaces 18 and data 19, to identify one or more intents 23. More information regarding CNLP may be provided in U.S. patent application Ser. No. 16/441,915, entitled "CONSTRAINED NATURAL LANGUAGE PROCESSING," and filed Jun. 14, 2019, the contents of which are hereby incorporated by reference as if set forth herein in its entirety. CNLP unit 22 may output the intents 23 to server 28, which may in turn invoke one of execution platforms 24 associated with the intents 23, passing the intents 23 to one of the execution platforms 24 for further processing.

Execution platforms 24 may represent one or more platforms configured to perform various processes associated with the identified intents 23. The processes may each perform a different set of operations with respect to, in the example of FIG. 1, databases 26. In some examples, execution platforms 24 may each include processes corresponding to different categories, such as different categories of data analysis including sales data analytics, health data analytics, or loan data analytics, different forms of machine learning, etc. In some examples, execution platforms 24 may perform general data analysis or other forms of data analytics that allows various different combinations of data stored to databases 26 to undergo complex processing and display via charts, graphs, etc. Execution platforms 24 may process the intents 23 to obtain results 25, which execution platforms 24 may return to server 28. Interface unit 20 may generate a GUI 21 that present results 25, transmitting the GUI 21 to client device 14.

In this respect, execution platforms 24 may generally represent different platforms that support applications to perform analysis of underlying data stored to databases 26, where the platforms may offer extensible application development to accommodate evolving collection and analysis of data (or in other words, data analytics) or perform other tasks/intents. For example, execution platforms 24 may include such platforms as Postgres (which may also be referred to as PostgreSQL, and represents an example of a relational database that performs data loading and manipulation), TensorFlow™ (which may perform machine learning in a specialized machine learning engine), and Amazon Web Services (or AWS, which performs large scale data analysis tasks that often utilize multiple machines, referred to generally as the cloud).

Client device 14 may include a client 30 (which may in the context of a chatbot interface be referred to as a "chat client 30"). Client 30 may represent a unit configured to present interfaces 21 and allow entry of data 19. Client 30 may execute within the context of a browser, as a dedicated third-party application, as a first-party application, or as an integrated component of an operating system (not shown in FIG. 1) of client device 14.

Returning to natural language processing, CNLP unit 22 may perform a balanced form of natural language processing compared to other forms of natural language processing. Natural language processing may refer to a process by which host device 12 attempts to process data 19 indicative of inputs (which may also be referred to as "inputs 19" for ease of explanation purposes) provided via a conversational interaction with client device 14. Host device 12 may dynamically prompt user 16 for various inputs 19, present clarifying questions, present follow-up questions, or otherwise interact with the user in a conversational manner to elicit input 19. User 16 may likewise enter the inputs 19 as sentences or even fragments, thereby establishing a simulated dialog with host device 12 to identify one or more intents 23 (which may also be referred to as "tasks 23").

Host device 12 may present various interfaces 21 by which to present the conversation. An example interface may act as a so-called "chatbot," which may attempt to mimic human qualities, including personalities, voices, preferences, humor, etc. in an effort to establish a more conversational tone, and thereby facilitate interactions with the user by which to more naturally receive the input. Examples of chatbots include "digital assistants" (which may also be referred to as "virtual assistants"), which are a subset of chatbots focused on a set of tasks dedicated to assistance (such as scheduling meetings, make hotel reservations, and schedule delivery of food).

A number of different natural language processing algorithms exist to parse the inputs 19 to identify intents 23, some of which depend upon machine learning. However, natural language may not always follow a precise format, and various users may have slightly different ways of expressing inputs 19 that result in the same general intent 23, some of which may result in so-called "edge cases" that many natural language algorithms, including those that depend upon machine learning, are not programed (or, in the context of machine language, trained) to specifically address. Machine learning based natural language processing may value naturalness over predictability and precision, thereby encountering edge cases more frequently when the trained naturalness of language differs from the user's perceived naturalness of language. Such edge cases can sometimes be identified by the system and reported as an inability to understand and proceed, which may frustrate the user. On the other hand, it may also be the case that the system proceeds with an imprecise understanding of the user's intent, causing actions or results that may be undesirable or misleading.

Other types of natural language processing algorithms utilized to parse inputs 19 to identify intents 23 may rely on keywords. While keyword based natural language processing algorithms may be accurate and predictable, keyword based natural language processing algorithms are not precise in that keywords do not provide much if any nuance in describing different intents 23.

In other words, various natural language processing algorithms fall within two classes. In the first class, machine learning-based algorithms for natural language processing rely on statistical machine learning processes, such as deep neural networks and support vector machines. Both of these machine learning processes may suffer from limited ability to discern nuances in the user utterances. Furthermore, while the machine learning based algorithms allow for a wide variety of natural-sounding utterances for the same intent, such machine learning based algorithms can often be unpredictable, parsing the same utterance differently in successive versions, in ways that are hard for developers and users to understand. In the second class, simple keyword-based algorithms for natural language processing may match the user's utterance against a predefined set of keywords and retrieve the associated intent.

In this instance, CNLP unit 22 may parse inputs 19 (which may, as one example, include natural language statements that may also be referred to as "utterances") in a manner that balances accuracy, precision, and predictability. CNLP unit 22 may achieve the balance through various design decisions when implementing the underlying language surface (which is another way of referring to the collection of sub-surfaces 18, or the "language"). Language surface 18 may represent a set of potential user utterances for which server 28 is capable of parsing (or, in more anthropomorphic terms, "understanding") the intent of the user 16.

The design decisions may negotiate a tradeoff between competing priorities, including accuracy (e.g., how frequently server 28 is able to correctly interpret the utterances), precision (e.g., how nuanced the utterances can be in expressing the intent of user 16), and naturalness (e.g., how diverse the various phrasing of an utterance that map to the same intent of user 16 can be). The CNLP processes may allow CNLP unit 22 to unambiguously parse inputs 19 (which may also be denoted as the "utterances 19"), thereby potentially ensuring predictable, accurate parsing of precise (though constrained) natural language utterances 19.

While natural language processing may facilitate such data analytics by users unaccustomed with formal (or in other words, structured) database languages, the user interface associated with natural language processing may, in some instances, be cluttered and difficult to understand due to the conversational nature of natural language processing. In some instances, the conversation resulting from natural language processing may distract certain users from the underlying data analytics result, thereby possibly detracting from the benefits of natural language processing in the context of data analytics.

In accordance with various aspects of the techniques described in this disclosure, server 28 may generate and provide a user interface, which client 30 may present, that better facilitates user interaction with data analytic systems that employ natural language processing. Rather than present a cluttered user interface in which users, such as user 16, struggle to understand results 25 produced by the data analytic system (which in this example is represented by system 10), various aspects of the techniques described in this disclosure may allow for a seamless integration of natural language processing with data analytics in a manner that results in a cohesive user interface 21 by which user may intuitively understand the results produced by the data analytics system.

User interface 21 enabled by way of the techniques described in this disclosure may provide, via a first portion (e.g., a first frame) of user interface 21, an interactive text box that allows users to express intents via natural language.

User interface 21 may also include a second portion (e.g., a second frame) that presents a historical log of previous inputs and responses (along with visual indications representative of such responses and/or results 25) from the natural language processing engine (which is denoted as CNLP unit 22 in this example), which allows user 16 to quickly assess how results 25 (which may also be referred to as "responses 25") were derived. User interface 21 may also include a third portion that presents a graphical representation of results 25 provided responsive to any inputs 19. In each instance, the first, second, and third portions do not overlap or otherwise obscure data that would otherwise be relevant to user 16 at a particular point in time, thereby allowing user 16 to better comprehend results 26 provided in the third portion of user interface 21 along with the historical log presented by the second portion of user interface 21.

In addition, the third portion of user interface 21 and the second portion of user interface 21 may be separately scrollable to accommodate how different users understand different aspects of results 25. Similar to human psychology in which predominantly right-brain users respond to creative and artistic stimuli and predominant left-brain users respond to logic and reason, user interface 21 divides the representation of result 25 into right-brain stimuli (e.g., graphical representation of results 25 in the third portion of user interface 21) and left-brain stimuli (e.g., a historical log of how results 25 were derived in the second portion of user interface 21). Regardless of the user's predominance of right-brain or left-brain, user interface 21 may synchronize the third portion of user interface 21 with the second portion of user interface 21 responsive to interactions with either the second portion of user interface 21 or the third portion of user interface 21, thereby facilitating data analytics regardless of the user's predominance with regard to right-brain or left-brain stimuli.

In operation, client 30 may present, via the first frame of user interface 21, an interactive text box in which user 16 may enter data representative of a current input (which may be referred to as the "current input 19" for ease of explanation). The interactive text box may provide suggestions (via, as one example) an expanding suggestion pane that extends above the interactive text box to facilitate user 16 in entering current input 19).

Client 30 may present, via the second frame of user interface 21, an interactive log of previous inputs (which may be denoted as "previous inputs 19'") entered prior current input 19. The first frame and second frame of user interface 21 may accommodate user 16 when user 16 represents a user having left-brained predominance, as the first frame and second frame of user interface 21 provide a more logical defined capability with expressing natural language utterances that directly generate results 25 using keywords and other syntax to which predominantly left-brain users predominantly relate.

Client 30 may further present, via the third frame of user interface 21, a graphical representation of result data 25 obtained responsive to current input 19. This third frame of user interface 21 may accommodate user 16 when user 16 represents a user having right-brained predominance, as the third frame of user interface 21 provides a more graphical/visual/artistic capability with expressing results 25 using visual representations of results 25 (e.g., charts, graphs, plots, etc.) that may represent multi-dimensional data (which may also be referred to as "multi-dimensional datasets" and as such may be referred to as "multi-dimensional data 25" or "multi-dimensional datasets 25").

To facilitate either type of user 16 (meaning predominantly left- or right-brained users), the second frame of user interface 21 and the third frame of user interface 21 are separately scrollable but coupled such that interactions in either the second frame of user interface 21 or the third frame of user interface 21 synchronize the second frame of user interface 21 and the third frame of user interface 21. In other words, user interface 21 may, via the third frame, enable visual users (or, in other words, right-brain predominant users) to understand how a visual representation of multi-dimensional data 25 are generated via current inputs 19 (and previous inputs 19') through synchronization of the second frame of user interface 21 to the third frame of user interface 21. Such visual users may select the visual representation presented in the third frame of user interface 21.

Moreover, user interface 21 may, via the third frame, enable logical users (or, in other words, left-brain predominant users) to understand how current inputs 19 (and previous inputs 19') result in a visual representation of multi-dimensional data 25 are generated through synchronization of the third frame of user interface 21 to the second frame of user interface 21. Such logical users may select input 19 presented in the second frame resulted in the visual representation presented in the third frame of user interface 21.

In this respect, various aspect of the techniques described in this disclosure may facilitate better interactions with respect to performing data analytics while also removing clutter and other distractions that may distract from understanding results 25 provided by data analytic systems, such as data analytic system 10. As a result, data analytic system 10 may operate more efficiently, as users 16 are able to more quickly understand results 25 without having to enter additional inputs and/or perform additional interactions with data analytic system 10 to understand presented results 25. By potentially reducing such inputs and/or interactions, data analytic system 10 may conserve various computing resources (e.g., processing cycles, memory space, memory bandwidth, etc.) along with power consumption consumed by such computing resources, thereby improving operation of data analytic systems themselves.

Moreover, various aspects of the techniques described in this disclosure may allow users 16 to interface with a graphical representation of a format for a visual representation of the underlying data (which may be stored as a table or other data structure having multiple-dimensions, and as a result, the data may be referred to a multi-dimensional data 25). Rather than enter cumbersome utterances (which are represented by inputs 19 in the example of FIG. 1) by which to define, via natural language, the visual representation of multi-dimensional data 25, user 16 may interface, via user interface 21, with a graphical representation (e.g., a wireframe) of a format for such visual representations of multi-dimensional data 25 (e.g., a chart, bubble chart, graph, etc.).

Furthermore, user interface 21 with which user 16 may interact with the graphical representation of the format for the visual representations of multi-dimensional data 25 may also provide data representative of input 19 (e.g., the complicated utterance or other natural language input) that the user would have entered to generate the visual representation of multi-dimensional data 25. This data representative of the input 19 may thereby enable user 16, who may be more right-brain predominant, to learn less visual natural language input 19 by which such visual representations of multi-dimensional data 25 may be generated.

In operation, client 30 may present, via user interface 21 (which may include the three frames discussed throughout this disclosure), a graphical representation of a format for visually representing multi-dimensional data 25. The format may change based on the particular visual representation of multi-dimensional data 25. For example, a bubble plot may include an x-axis, a y-axis, a bubble color, a bubble size, a slider, etc. As another example, a bar chart may include an x-axis, a y-axis, a bar color, a bar size, a slider, etc. In any event, the graphical representation may present a generic representation of a type of visual representation of multi-dimensional data 25, such as a generic bubble plot, a generic bar chart, or a generic graphical representation of any type of visual representation of multi-dimensional data 25.

User 21 may then interact with this general graphical representation of the visual representation of multi-dimensional data 25 to select one or more aspects (which may be another way to refer to the x-axis, y-axis, bubble color, bubble size, slider, or any other aspect of the particular type of visual representation of multi-dimensional data 25 that user 16 previously selected). As such, client 30 may receive, via user interface 21, the selection of an aspect of one or more aspects of the graphical representation of the format for visually representing multi-dimensional data 25.

After selecting the aspect, user 91 may interface with client 30, via user interface 21, to select a dimension of multi-dimensional data 25 that should be associated with the selected aspect. Client 30 may then receive, via user interface 30 and for the aspect of the one or more aspects of the graphical representation of the format for visually representing multi-dimensional data 25, an indication of the dimension of the one or more dimensions of multi-dimensional data 25.

Client 30 may next associate the dimension to the aspect to generate a visual representation of multi-dimensional data 25 (e.g., in the form of a bar chart, a line chart, an area chart, a gauge, a radar chart, a bubble plot, a scatter plot, a graph, a pie chart, a density map, a Gantt Chart, and a treemap. or any other type of plot, chart, graph or other visual representation). Client 30 may proceed to present, via user interface 21, the visual representation of multi-dimensional data 25.

As such, various aspects of the techniques described in this disclosure may facilitate generation of visual representations of multi-dimensional data 25 via graphical representations of the format for such visual representations, which may enable more visual (e.g., right-brain predominant) users to create complicated visual representations of the multi-dimensional data that would otherwise be difficult and time consuming (e.g., due to unfamiliarity with natural language utterances required to generate the visual representations). By reducing interactions while also explaining the corresponding natural language input along side the visual representation of mulit-dimensional data 25, data analytics system 10 may again operate more efficiently, as users 16 are able to more quickly understand results 25 without having to enter additional inputs and/or perform additional interactions with data analytic system 10 in an attempt to visualize multi-dimensional data 25 (which may also be referred to as a "result 25"). By potentially reducing such inputs and/or interactions, data analytic system 10 may conserve various computing resources (e.g., processing cycles, memory space, memory bandwidth, etc.) along with power consumption consumed by such computing resources, thereby improving operation of data analytic systems themselves.

Figure 2A:
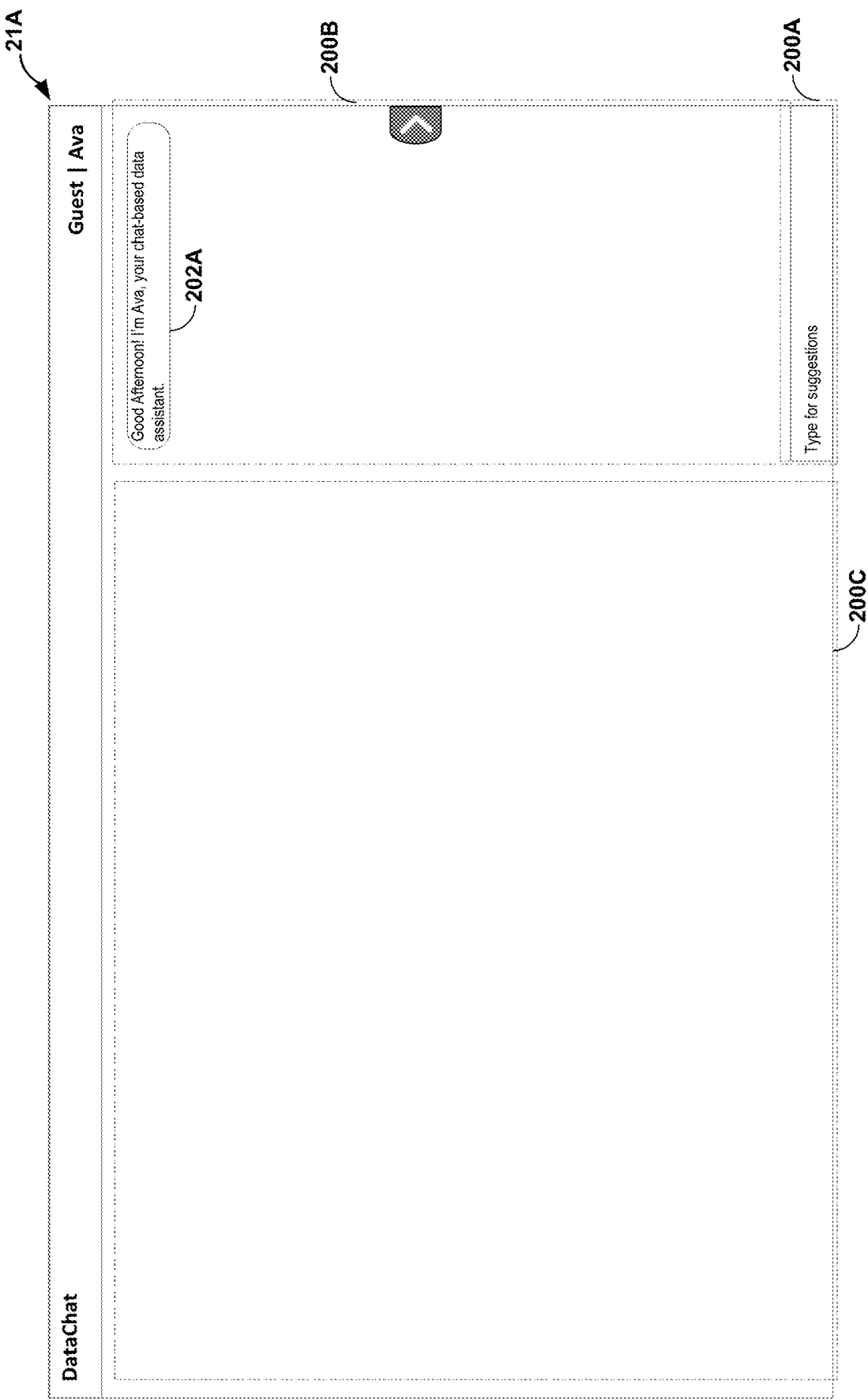
FIGS. 2A-2K are diagrams illustrating examples of user interfaces that facilitate interactions with the data analytics system shown in the example of FIG. 1 in accordance with various aspects of the techniques described in this disclosure.

FIGS. 2A-2K are diagrams illustrating examples of user interfaces that facilitate interactions with the data analytics system shown in the example of FIG. 1 in accordance with various aspects of the techniques described in this disclosure. In the example of FIG. 2A, a user interface 21A may represent one example of user interface 21 shown in the example of FIG. 1.

As shown in the example of FIG. 2A, user interface 21A includes a first frame 200A (which may also be referred to as a "first pane 200A"), a second frame 200B (which may also be referred to as a "second pane 200B"), and a third frame 200C (which may also be referred to as a "third pane 200C"). First frame 200A may represent an interactive text box in which user 16 may enter current input 19. Via first frame 200A, user 16 may, in other words, enter natural language utterances (which again is another way to refer to current input 19) by which to interact with the chatbot, which in this instance is referred to as "Ava" per dialogue 202A.

Second frame 200B may represent an interactive log of previous inputs 19' entered prior to current input 19 (along with responses from the chatbot, such as dialogue 202A). Previous inputs 19' may also be referred to as "previous dialogues 19'" given that user 16 maintains a dialogue with the chatbot (which is another way to refer to data analytics system 10, and therefore may also be referred to as "chatbot 10") in order to interact with data analytics system 10. Given that second frame 200B may represent a log of the dialogue between user 16 and chatbot 10, second frame 200B may be referred to as "dialogue frame 200B" or "dialogue pane 200B."

Third frame 200C may represent an interactive frame by which a graphical representation of results 25, where such results 25 are obtained responsive to current input 19. Third frame 200C may, as shown in subsequent FIGS. 2B-2K, provide a graphical representation of results 25 as a log of the graphical representation of results 25 over time, allowing user 16 to traverse the log of the graphical representation of results 25 via separately scrolling of third frame 200C independent of second frame 200B. Third frame 200C may, as a result, also be referred to as "graphical log frame 200C" and/or "graphical log pane 200C."

Figure 2B:
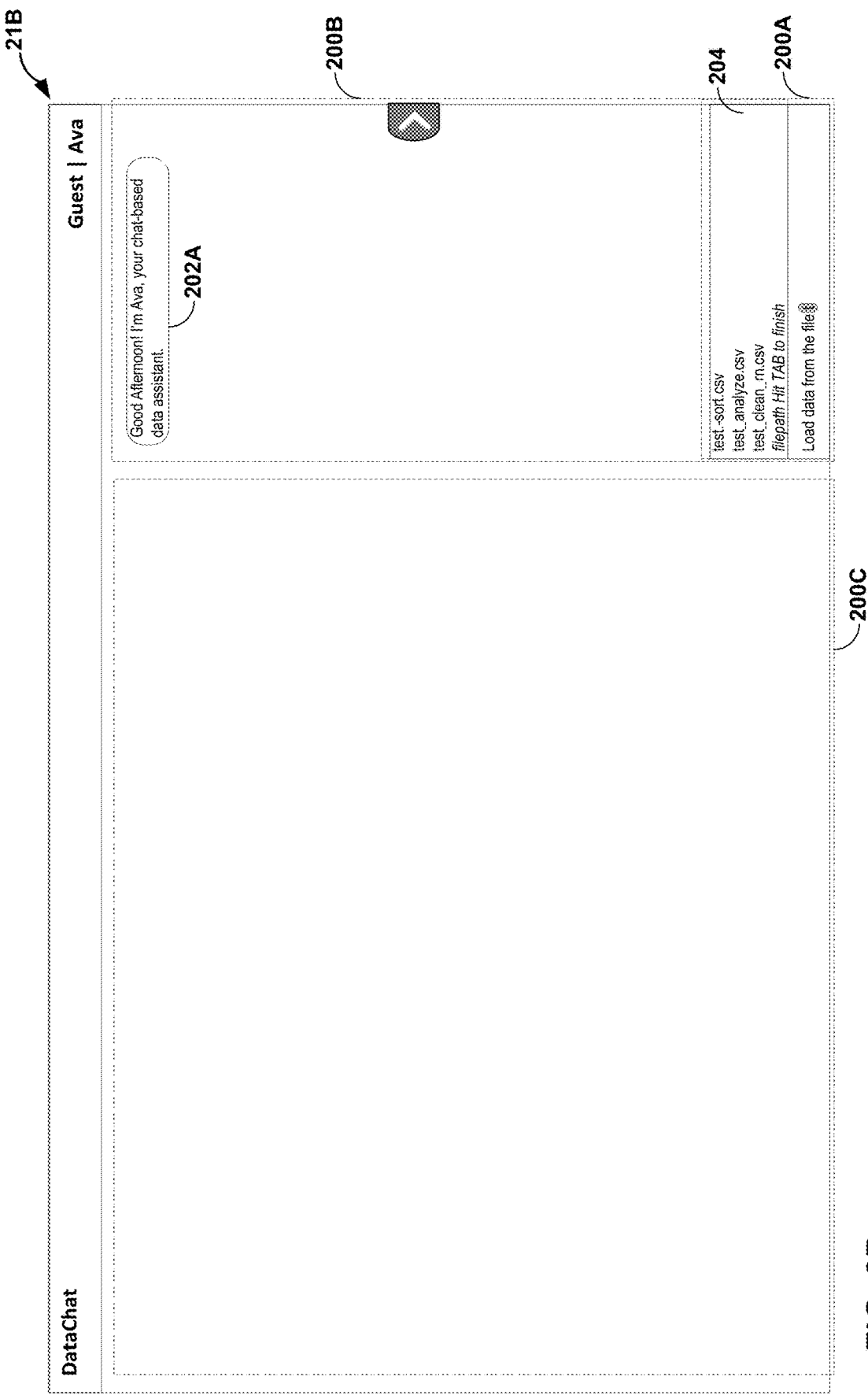

In the example of FIG. 2B, a user interface 21B may represent another example of user interface 21 shown in the example of FIG. 1. User interface 21B, similar to user interface 21A, includes first frame 200A, second frame 200B, and third frame 200C (which may collectively be referred to as "frames 200A-200C" or "frames 200"). The difference between user interface 21B and user interface 21A is that user 16 has begun to enter text into first frame 200A (e.g., "Load data from the file t") as current input 19, where user interface 21B, responsive to receiving current input 19, exposes an autocomplete box 204 that includes a number of different autocomplete recommendations for a file having a filename or other identifier that begins with the letter 't' (i.e., "test-sort.csv," "test_analyze.csv," "test_clean_m.csv" in the example of FIG. 2B) along with a prompt to autocomplete the "filepath" by "Hit[ting] TAB to finish."

In this respect, the interactive text box represented by first frame 200A may automatically perform an autocomplete operation to facilitate entry of current input 19. The interactive text box may limit a number of autocomplete recommendation (which may be referred to as "recommendations") to a threshold number of recommendations (as there may be a large number—e.g., 10, 20, . . . 100, . . . 1000, etc. of recommendations) to a threshold number (e.g., three in this example) of recommendations.

The interactive text box may limit the number of recommendations to reduce clutter and facilitate user 16 in selecting a recommendation that is most likely to be useful to user

16. User interface 21B may prioritize recommendations based on preferences set by user 16, recency of accessing a various file, or any other priority based algorithm (including machine-learning or other artificial intelligent priority and/or ranking algorithms). In some examples, the threshold is set so that autocomplete box 204 does not fully obscure (but may partially obscure) second frame 200B, where such threshold may vary based on display size, current viewing zoom level, device type (e.g., smartphone, laptop, desktop, etc.), and the like.

Figure 2C:
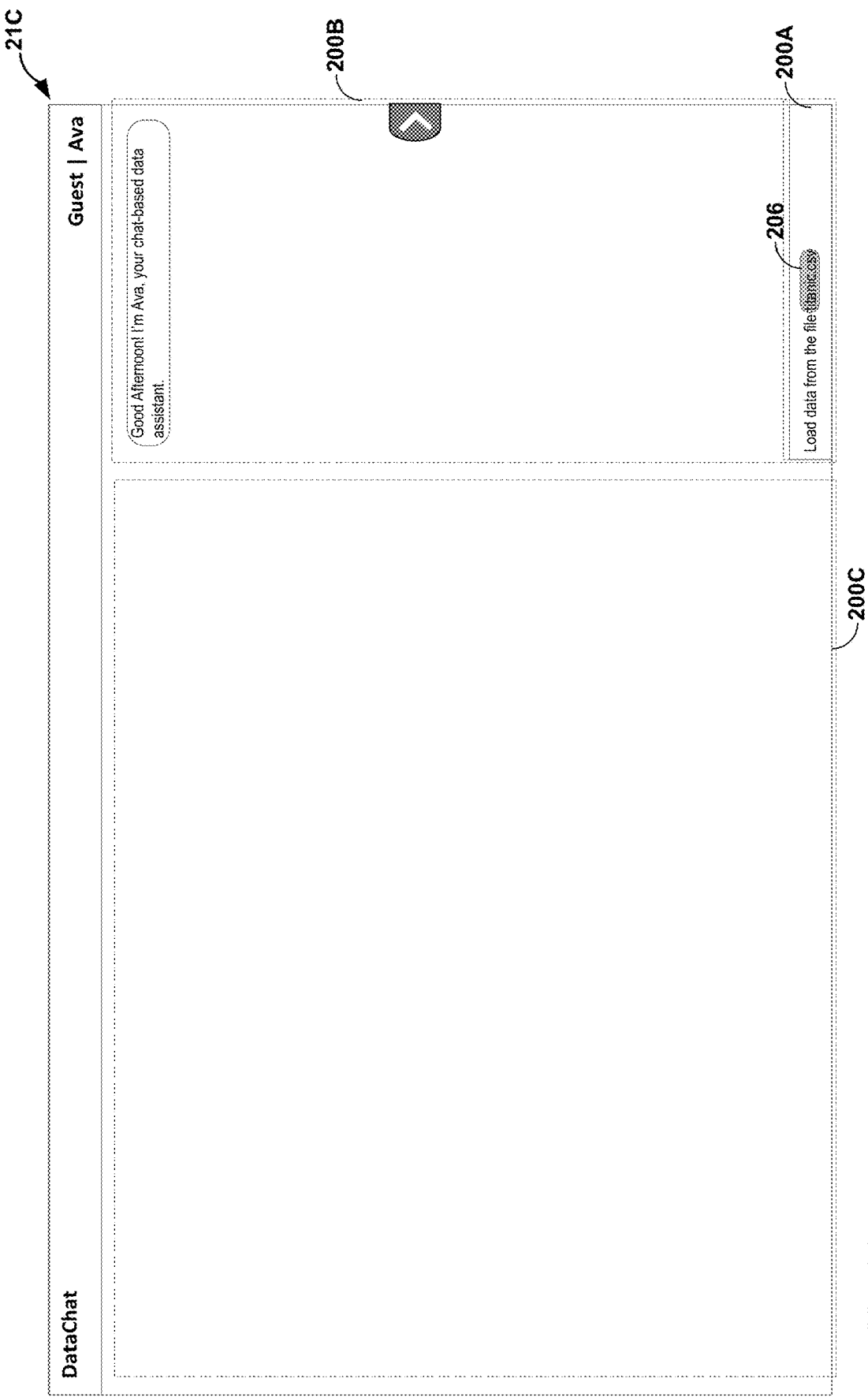

Referring next to the example of FIG. 2C, a user interface 21C may represent another example of user interface 21 shown in the example of FIG. 1. User interface 21C, similar to user interface 21B, includes "frames 200"). The difference between user interface 21C and user interface 21B is that user 16 has completed typing the file name "titanic.csv" in the interactive text box represented by first frame 200A. The interactive text box may also automatically insert highlight 206 to denote portions of current input 19 that references named aspects (such as the filename "titanic.csv" in the example of FIG. 2C) of a database to which current input 19 is directed. Such highlighting may enable user 16 to understand visually that named aspects are being recognized by data analytic system 10 as current input 19 is entered by user 16.

Figure 2D:
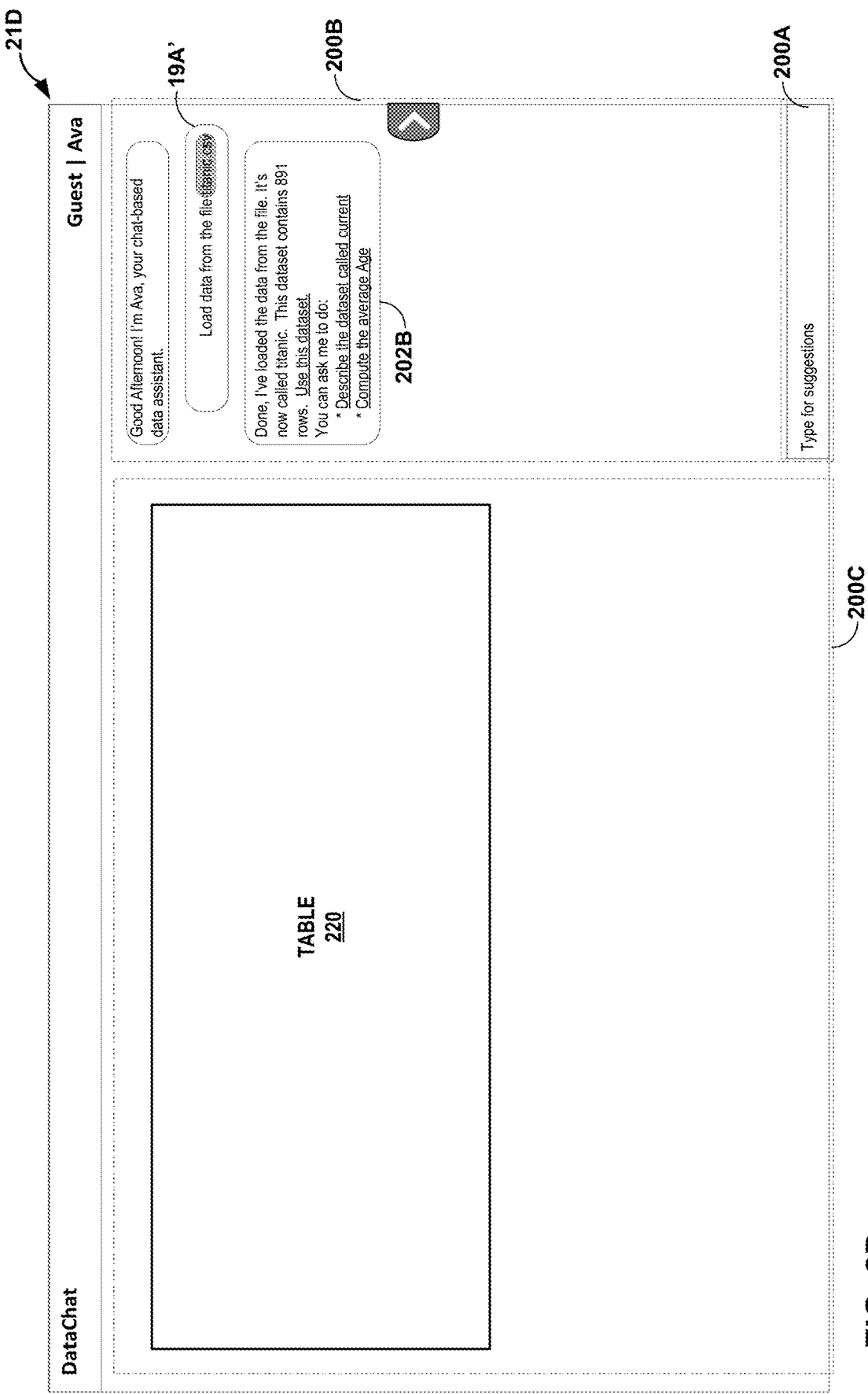

In the example of FIG. 2D, a user interface 21D may represent another example of user interface 21 shown in the example of FIG. 1. User interface 21D is similar to user interface 21C in terms of also including frames 200, but shows the result of entering current input 19 into the interactive text box, at which point current input 19 becomes previous input 19A'. Chatbot 19 returns with dialogue 202B, which is presented in dialogue frame 200B, and table 220 reflective of "titanic.csv," which is presented as a table 220 in graphical log frame 200C.

Figure 2E:
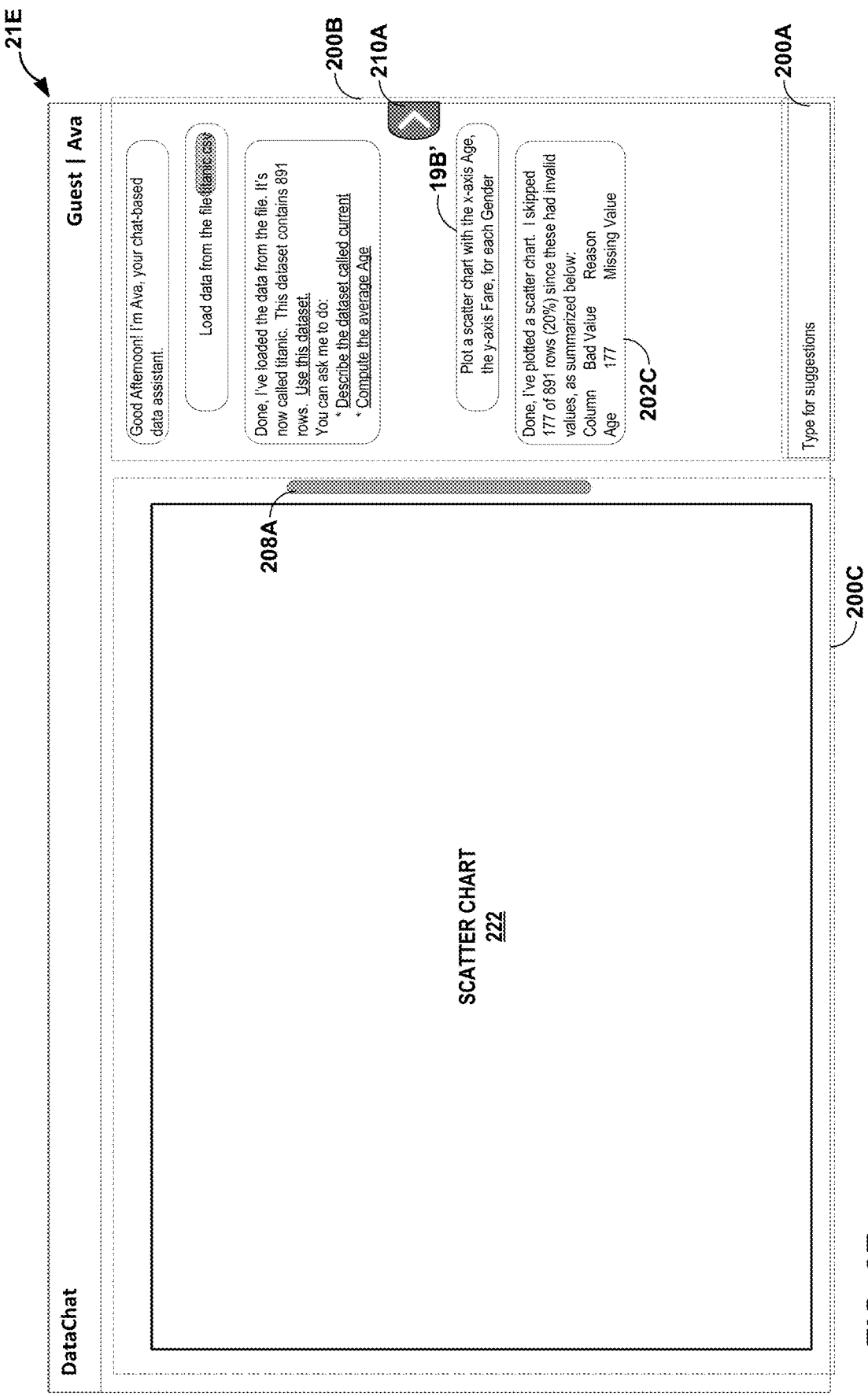

In the example of FIG. 2E, a user interface 21E may represent another example of user interface 21 shown in the example of FIG. 1. User interface 21E is similar to user interface 21D in terms of also including frames 200, but shows the result of entering current input 19 (which is shown as previous input 19B' as such current input 19 was entered in first frame 200A). Chatbot 19 returns with dialogue 202C, which is presented in dialogue frame 200B and includes additional data regarding the processing of previous input 19B' that does not obscure any portion of graphical log frame 200C. Chatbot 19 also returns a scatter chart reflective of data analysis with respect to "titanic.csv," which is presented as a scatter chart 222 in graphical log frame 200C.

As user interface 21E added scatter chart 222 to graphical log frame 200C below table 222, table 220 moved out of view resulting in user interface 21E adding scroll bar 208A along a right side of graphical log frame 200C. User 16 may select scroll bar 208A (or use mouse-based scrolling or other forms of scrolling) to separately scroll graphical log frame 200C. That is, scrolling graphical log frame 200C may not result in scrolling of dialogue frame 200B, where graphical log frame 200C may be independently scrollable from dialogue frame 200B, and dialogue frame 200B may be independently scrollable from graphical log frame 200C. In this respect, left-brain users may consider the graphical and/or visual nature of graphical log frame 200C without distractions in scrolling of corresponding dialogue frame 200B, while right-brain users may consider the more textual and/or logical nature of dialogue frame 200B without distractions in scrolling of corresponding graphical log frame 200C.

In addition, user interface 21E includes a full-screen indication 210A that allows user 16 to transition user interface 21E into a full-screen mode (from a partial-screen mode) in which dialogue frame 200B is minimized and graphical log frame 200C is maximized (across the full width of user interface 21E). User interface 21E, as shown in the example of FIG. 2E, currently operates in partial-screen mode in that graphical log frame 200C does not span at least a substantial portion (e.g., 90-100%) of a width of user interface 21E, and dialogue frame 200B is not minimized and still presented as part of user interface 21E.

Partial-screen mode may facilitate viewing of user interface 21E via a client device 14 having larger displays (e.g., a desktop computer, workstation, larger laptops, etc.), but not be well suited for client device 14 having smaller displays (e.g., smartphones, ultrabooks, etc.). In partial-screen mode, dialogue frame 200B may be positioned above (if not directly above) or adjacent to first frame 200A along a top boundary of first frame 200A, and both dialogue frame 200B and first frame 200A may have a similar width. Both first frame 200A and dialogue frame 200B reside adjacent to a right side of graphical log frame 200C.

Figure 2F:
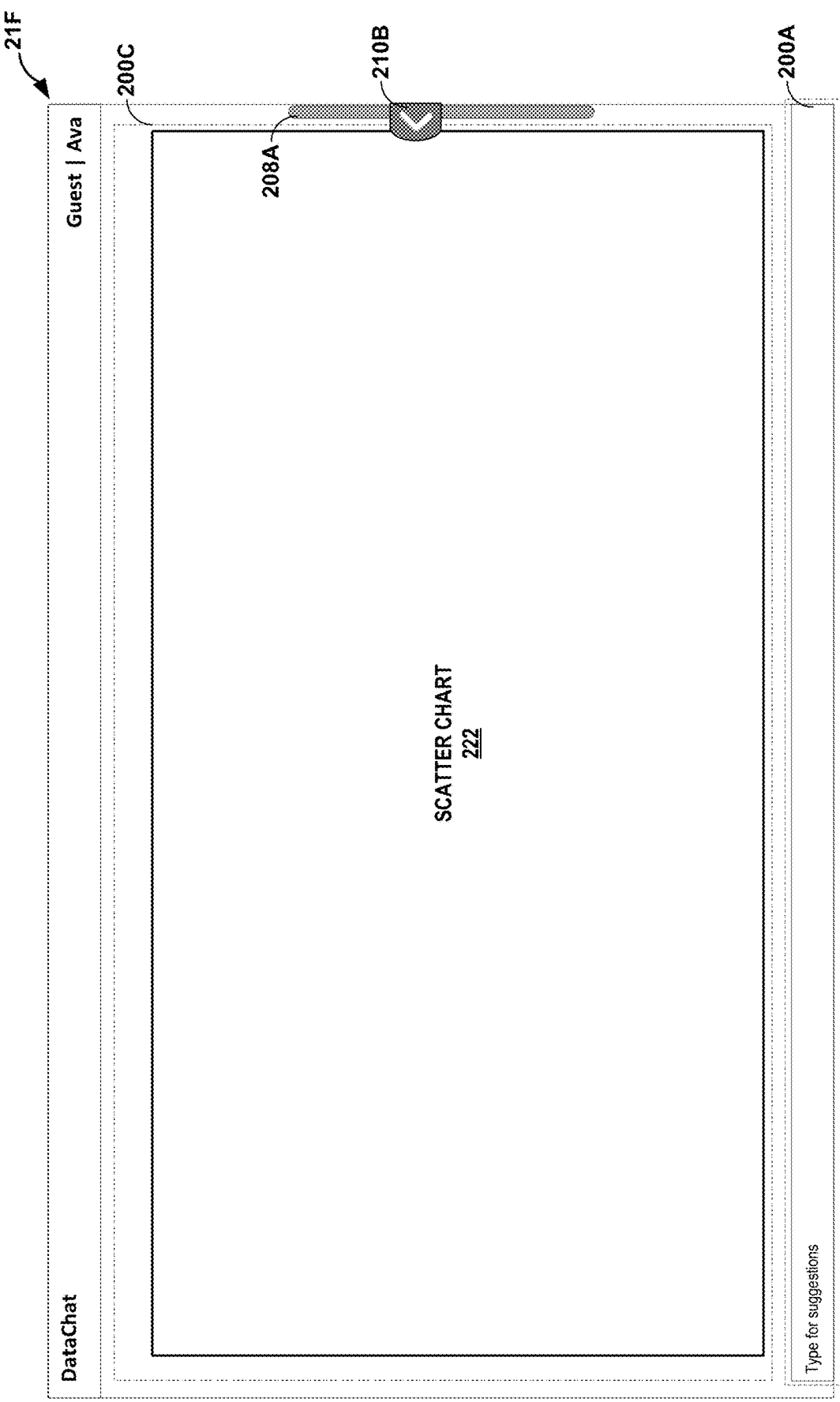

Referring next to the example of FIG. 2F, a user interface 21F may represent another example of user interface 21 shown in the example of FIG. 1. User interface 21F is similar to user interface 21E in terms of also including frames 200, but shows the result of user 16 selecting full-screen indication 210A.

Responsive to receiving the indication that user 16 selected full-screen indication 210A, user interface 21F transitions to full-screen mode in which dialogue frame 200B is minimized and graphical log frame 200C is maximized (across the full width of user interface 21F). User interface 21F reformats scatter chart 222 within graphical log frame 200C to span nearly (e.g., 80-99% of) the whole width of graphical log frame 200C. Also, responsive to receiving the indication that user 16 selected full-screen indication 210A, user interface 21F reformats first frame 200A to span nearly (e.g., 80-99% of) the width of user interface 21F. As such, first frame 200A is, in this example, adjacent to a bottom of graphical log frame 200C, while graphical log frame 200C is adjacent to a top of first frame 200A.

Furthermore, user interface 21F may replace full-screen indication 210A with partial-screen indication 210B. Partial-screen indication 210B may transition user interface 21F back to the partial screen mode of user interface 21E when selected by user 16.

In some examples, user interface 21 may automatically transition between partial-screen mode and full-screen mode based on a type of device on which user interface 21 is displayed. The type of device may indicate whether the device is a smartphone, laptop computer, tablet computer, hybrid computer, desktop computer. In other instances, the type of device may specify a type of display in terms of size, resolution, number of displays, etc. For certain device types (smartphones, tablet computers, display size under a threshold, etc.), user interface 21 may select partial-screen mode, while for other device types (e.g., desktop computers, workstations, display size above the threshold), user interface 21 may select full-screen mode. In this way, user interface 21 may transition, responsive to the type of device detected, into a full-screen mode in which dialogue frame 200B is minimized and graphical log frame 200C resides above first frame 200A.

Figure 2G:
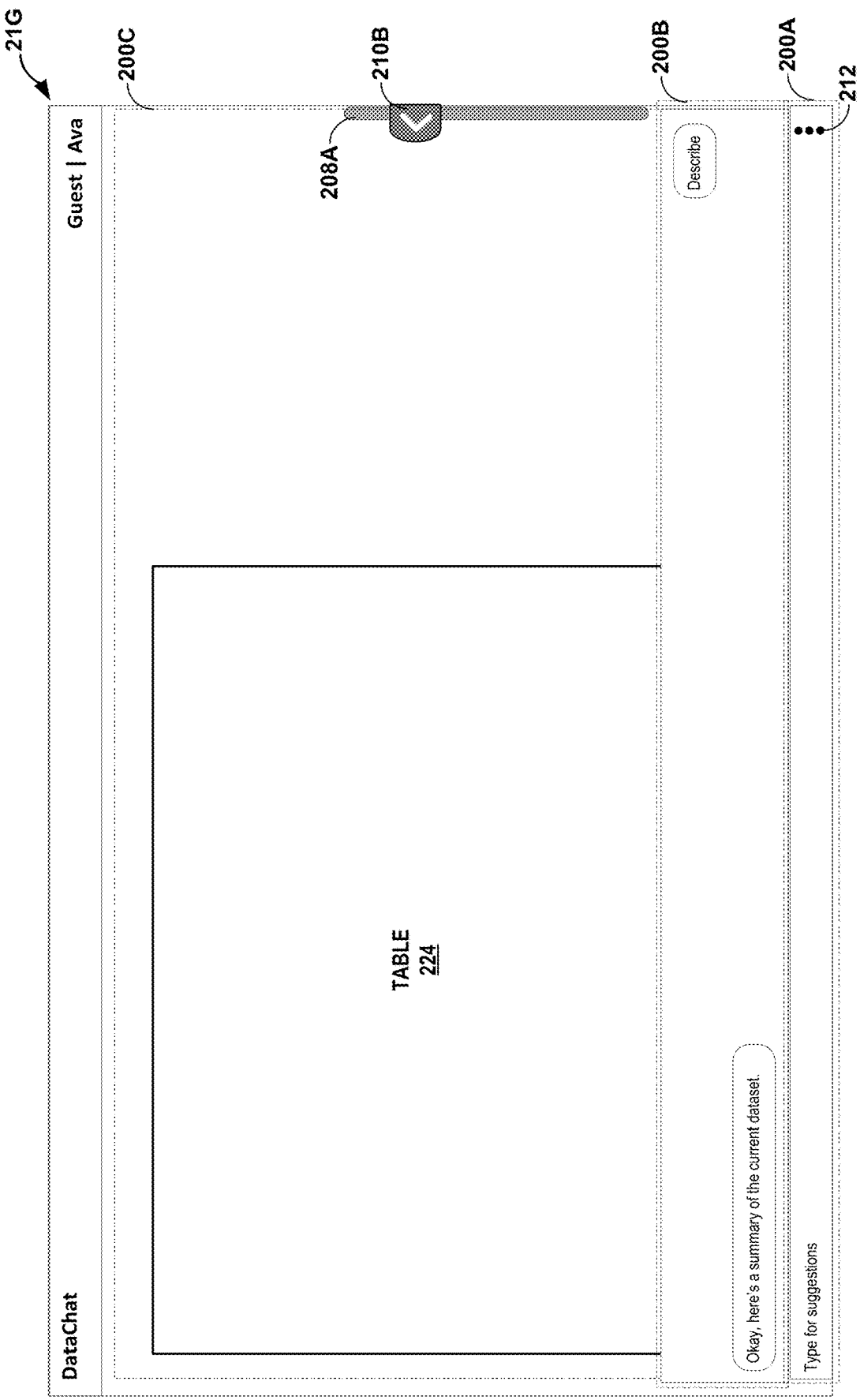

In the example of FIG. 2G, a user interface 21G may represent another example of user interface 21 shown in the example of FIG. 1. User interface 21G is similar to user interface 21F in terms of also including frames 200, but shows the result of user 16 selecting an expose indication 212. First frame 200A may include expose indication 212 that, when selected by user 16 while user interface 21G is in full-screen mode, results in user interface 21G exposing dialogue frame 200B. In some examples, first frame 200A may only include expose indication 212 while user interface 21G is in full-screen mode. Responsive to user 16 selecting expose indication 212, user interface 21G may expose dialogue frame 200B such that dialogue frame 200B at least partially overlaps (but does not fully obscure) graphical log frame 200C.

Figure 2H:
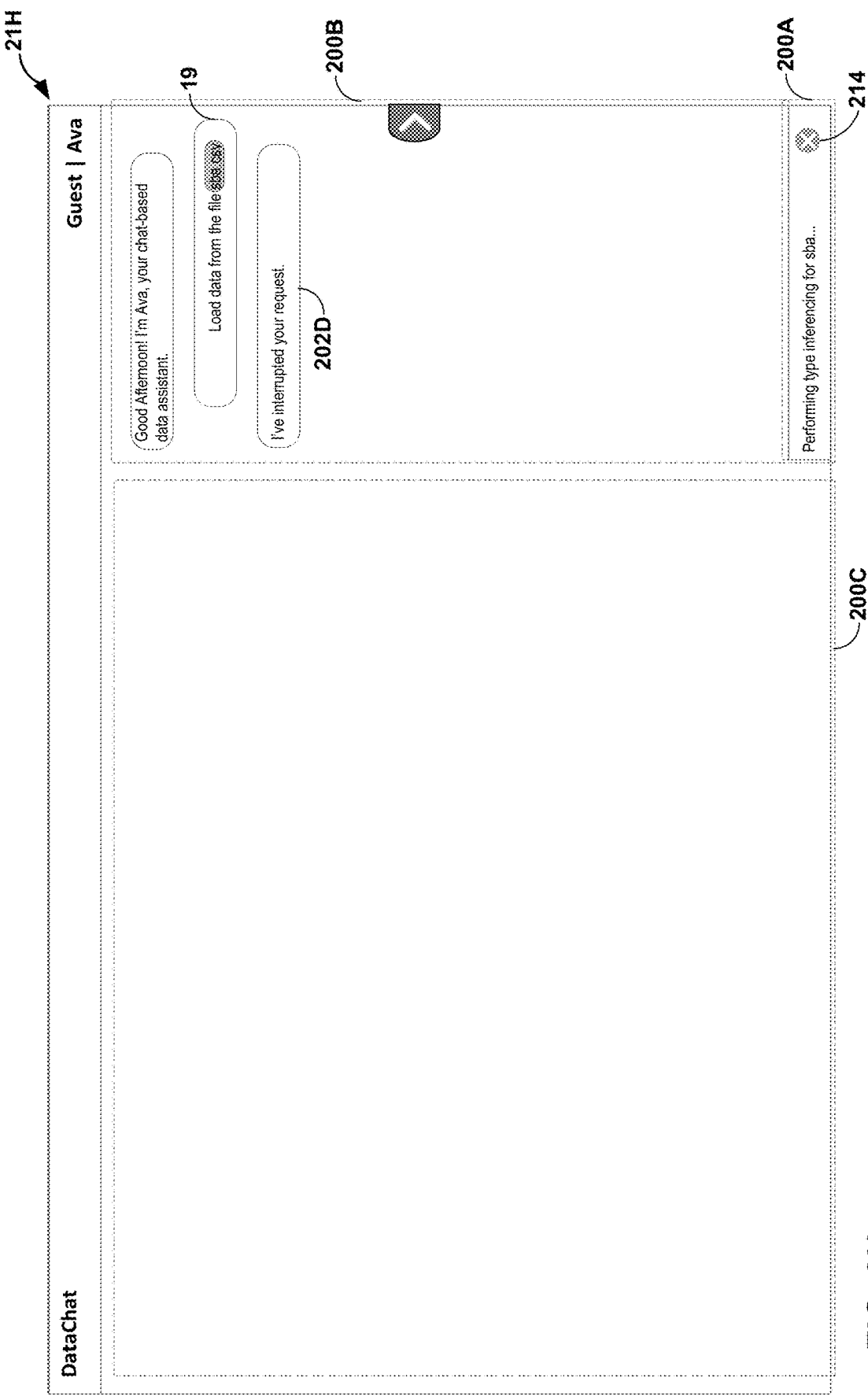

Turning to the example of FIG. 2H, a user interface 21H may represent another example of user interface 21 shown in the example of FIG. 1. User interface 21H is similar to user interface 21D in terms of also including frames 200, but shows the result of user 16 selecting a cancel indication 214. First frame 200A may include cancel indication 214 to enable user 16 to cancel processing of current input 19 (which is still current despite being shown in dialogue frame 200B as processing has not yet completed).

In some instances, user 16 may enter current inputs 19 that inadvertently require significant amounts of processing that may take very long times (multiple minutes, an hour or more, etc.) or which may hang during processing. To allow user 16 to cancel such inputs 19, first frame 200A may present cancel indication to cancel processing of current input 19. User interface 21H, responsive to selection of cancel indication 214, may interface with chatbot 10 to cancel processing of current input 19, presenting dialogue 202D indicating that chatbot 10 has "interrupted your request."

Figure 2I:
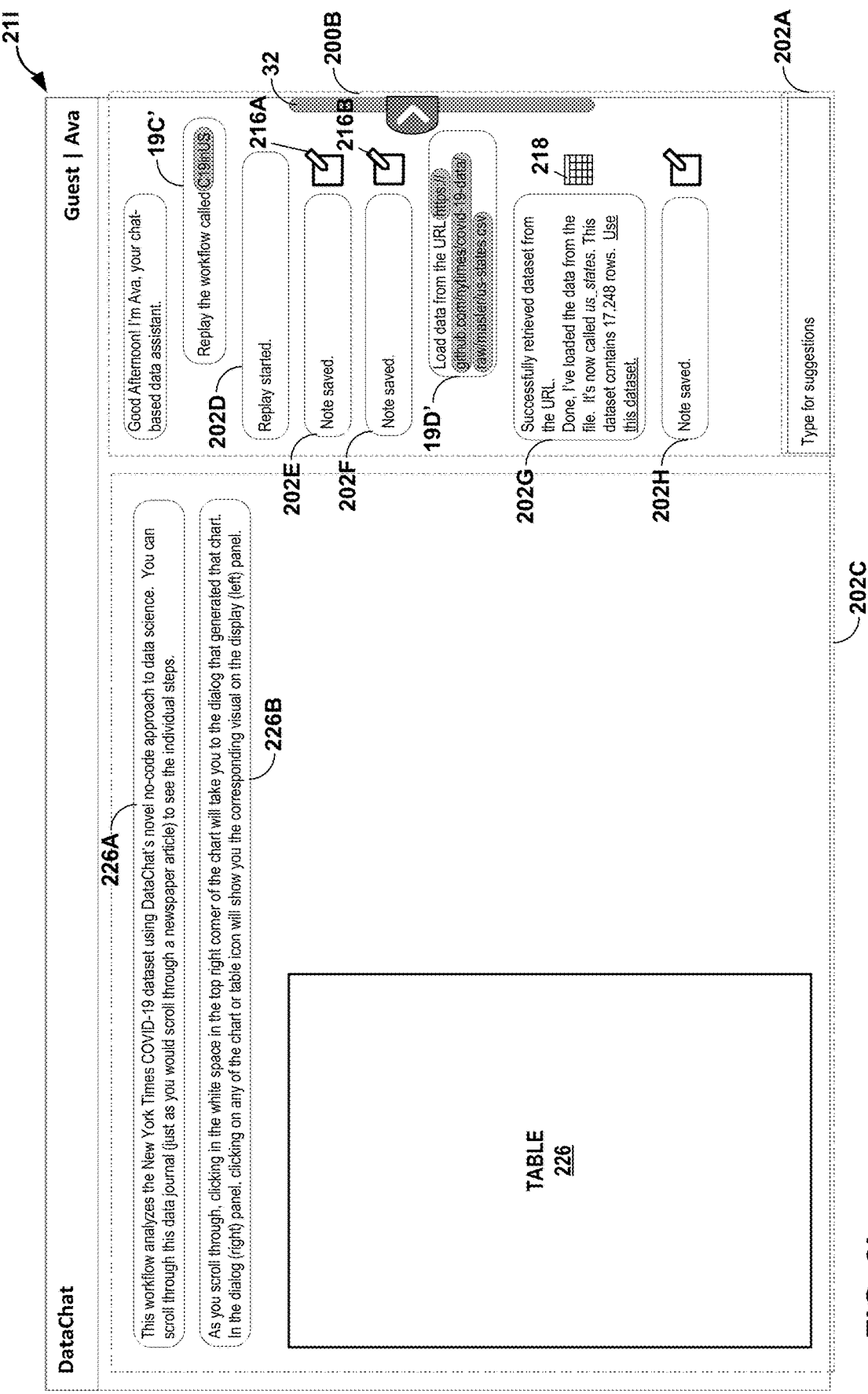

Considering next the example of FIG. 2I, a user interface 21I may represent another example of user interface 21 shown in the example of FIG. 1. User interface 21I is similar to user interface 21H in terms of also including frames 200, but shows the result of user 16 entering previous input 19C' that indicated that chatbot 10 should "Replay the workflow called C19inUS, where C19inUS is highlighted to signify that this workflow (which is a form of a dataset) is recognized by chatbot 10.

Responsive to receiving previous input 19C (what at the time was current input 19 but is denoted as previous input 19C' as user interface 21I has already processed previous input 19C'), user interface 21I may replay a previous session entitled "C19inUS" creating dialogues 202D-202H with previous input 19D' interspersed between dialogues 202F and 202G in dialogue frame 200B.

The notes referenced in dialogues 202E and 202F refer to respective notes 226A and 226B shown in graphical log frame 200C. Each of dialogues 202E and 202F have a respective note indication 216A and 216B, which are presented in dialogue frame 200B adjacent to dialogues 202E and 202F. Note indications 216A and 216B are associated with respective notes 226A and 226B. When either of note indications 216A and 216B are selected by user 16, user interface 21I may scroll graphical log frame 200C to present notes 226A and 226B.

Similarly, dialogue 202G includes an associated table indication 218 that is presented adjacent to dialogue 202G in dialogue frame 200B. Table indication 218 is associated with a table 226 presented in graphical log frame 202C. Responsive to user 16 selecting table indication 218, user interface 21I may scroll graphical log frame 202C to present table 226. In this respect, user interface 21I may enable interactions with dialogue frame 200B (via note indications 216A and 216B and table indication 218) that alter how graphical log frame 202C scrolls to reveal previous or future content, such as notes 226A/226B and table 226.

However, as noted by note 226B, "[a]s you scroll through, clicking in the white space in the top right corner of the chart will take you to the dialog [in dialogue frame 200B] that generated that chart." In this way, graphical log frame 200C may enable user 16 to select a chart, note, table, or other graphical representation of results 25 to scroll dialogue frame 200B. While graphical log frame 200C is independently scrollable (or in other words, separately scrollable) relative to dialogue frame 200B and dialogue frame 200B is independently scrollable (or in other words, separately scrollable) relative to graphical log frame 200C, each of dialogue frame 200B and graphical log frame 200C are interconnected by various interactions in either dialogue frame 200B or graphical log frame 200C to synchronize dialogue frame 200B with graphical log frame 200C or synchronize graphical log frame 200C with dialogue frame 200B.

Figure 2J:
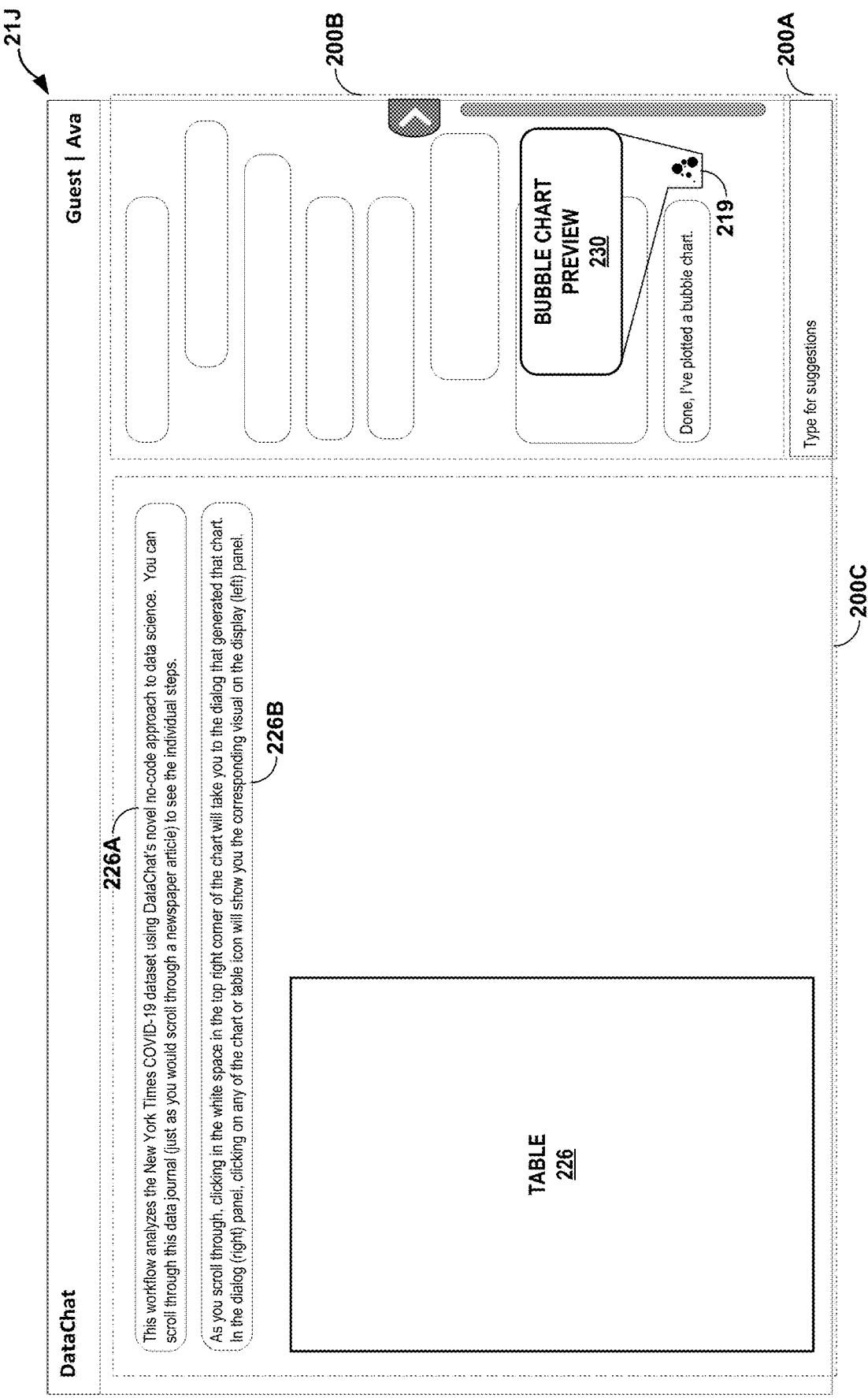

In the example of FIG. 2J, a user interface 21J may represent another example of user interface 21 shown in the example of FIG. 1. User interface 21J is similar to user interface 21I in terms of also including frames 200, but shows the result of user 16 hovering over a bubble chart indication 219 presented by dialogue frame 200B. Upon receiving an indication that user 16 is hovering (e.g., with a mouse pointer or other input device) over bubble chart indication 219, user interface 21J may present a bubble chart preview 230 of a previous or future (relative to where dialogue frame 200B is in time) bubble chart presented in graphical log frame 200C. Bubble chart preview 230 may depict the bubble chart presented in graphical log frame 200C via pop up window, overlay or other graphical form. Responsive to user selecting bubble chart indication 219, user interface may transition to user interface 21K, which is discussed in more detail with respect to the example of FIG. 2K.

Figure 2K:
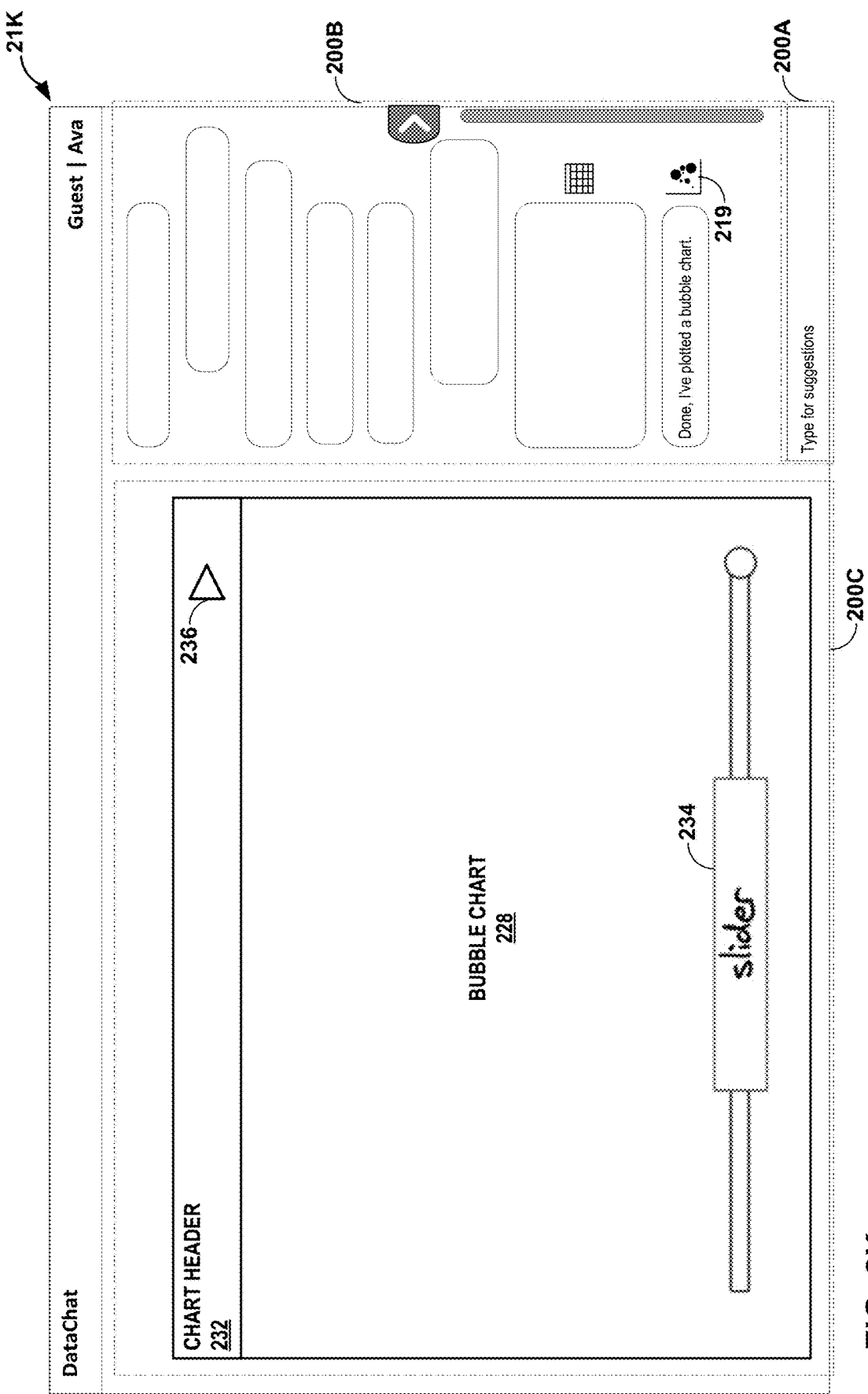

In the example of FIG. 2K, user interface 21K may represent another example of user interface 21 shown in the example of FIG. 1. User interface 21K is similar to user interface 21J in terms of also including frames 200, but shows the result of user 16 selecting bubble chart indication 219 presented by dialogue frame 200B. Responsive to selecting bubble chart indication 219, user interface 21K may scroll graphical log frame 200C to present bubble chart 228 that is identified or otherwise associated with bubble chart indication 219.

Bubble chart 228 may include a bubble chart header 232 and a slider 234, where bubble chart header 232 may include a play indication 236 (as well as other indications not discussed in detail herein). Slider 234 may represent an interactive slider that user 16 may select to change adapt bubble chart to accommodate changing dimensions of multidimensional data 25. User 16 may select play indication 236, which may cause user interface 21K to "play" an interaction as if user slid slider 234 along the, in this example, x-axis to manipulate bubble chart 228 along the dimensions of mutlidimensional data 25 represented graphically by bubble chart 228.

Figure 3A:
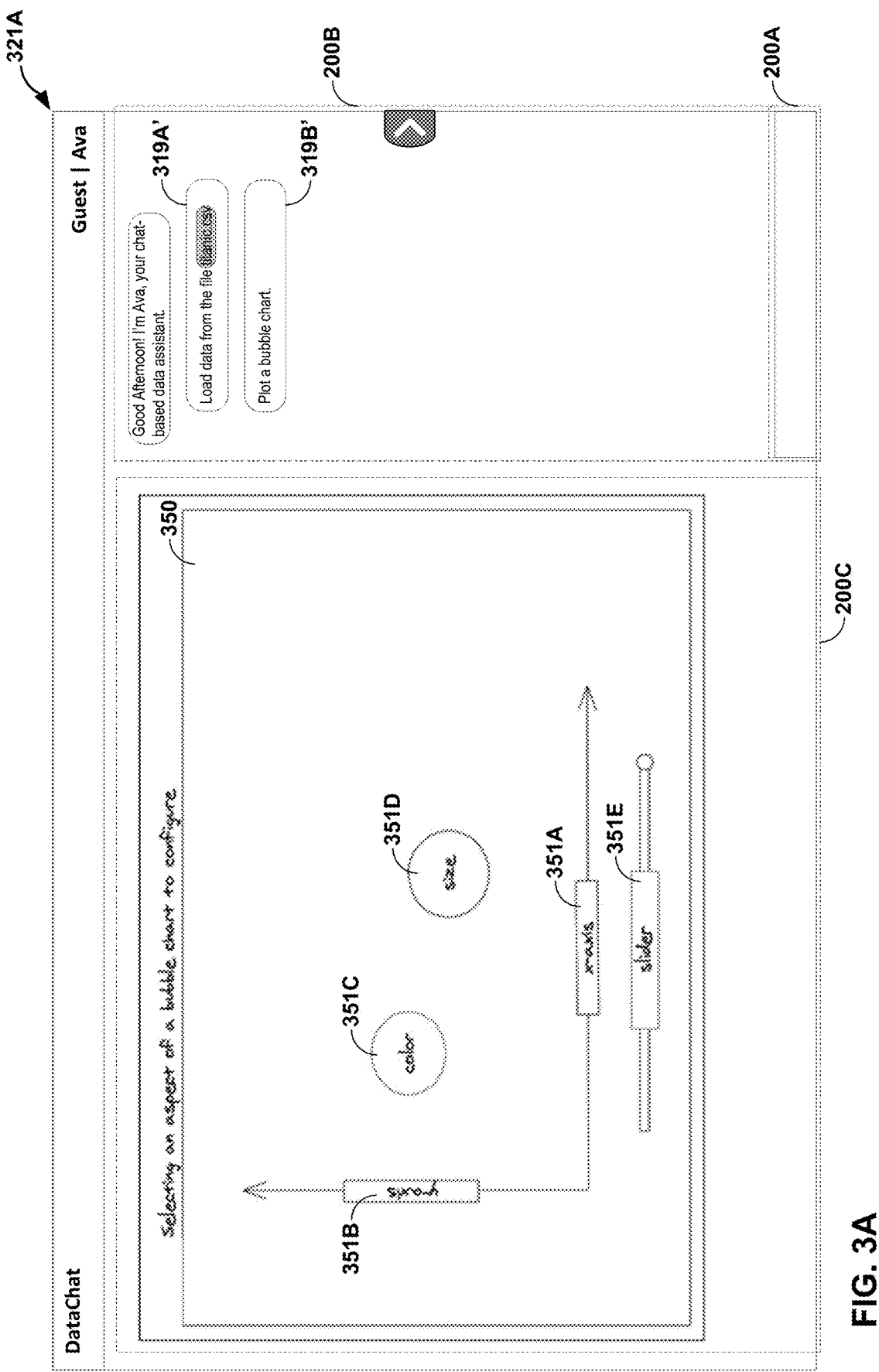
FIGS. 3A-3E are diagrams illustrating examples of the user interface that facilitate interactions with the data analytics system shown in the example of FIG. 1 in accordance with various aspects of the techniques described in this disclosure.

FIGS. 3A-3E are diagrams illustrating examples of the user interface that facilitate interactions with the data analytics system shown in the example of FIG. 1 in accordance with various aspects of the techniques described in this disclosure. In the example of FIG. 3A, a user interface 321A may represent one example of user interface 21 shown in the example of FIG. 1.

User interface 321A may be similar to user interface 21B shown in the example of FIG. 2B in that user interface 321A includes frames 200, but may differ in that user 16 has entered two previous inputs 319A' and previous input 319B' in order to present, via user interface 321A, a graphical representation 350 of a format for visually representing multi-dimensional data 25. In the example of FIG. 3A, user 16 has entered previous input 319A' to "Load data from the file titantic.csv" to load multi-dimensional data 25 related to passengers aboard the Titanic on the trip in which the Titanic sunk.

User 16 also entered previous input 319B' to "Plot a bubble chart," which is a generic command that results in display of graphical representation 350 of a format for visually representing multi-dimensional data 25 as a bubble chart. In addition, although not shown in the example of FIG. 3A, user interface 321A may perform autocomplete to provide a list of relevant charts (e.g., a line chart, bubble chart, scatter chart, etc.) for user 16, which user 16 may select to autocomplete the type of chart. Moreover, user interface 321A may autocomplete partial utterances entered as previous input 319A' in which user 16 only types, as one example, "Plot a" or "bubble chart" and presses enter to input this partial utterance. Chatbot 10 may determine based on past interactions with user 16 that such a partial utterance should result in presentation of graphical representation 350 in graphical log frame 200C.

Although described with respect to a command entered as previous input 319B', various aspects of the techniques described in this disclosure may enable user 16 to arrive at graphical representation 350 in various other ways. For example, user interface 321A may present a menu having an option by which to select graphical representation 350 for configuring a bubble chart for multi-dimensional data 25. As another example, user interface 321A may present a graphical indication (such as an icon) for various charts in a table listing multi-dimensional data 25 (which is not shown in the example of FIG. 3A, but would be similar to play indication 236 of user interface 21K shown in the example of FIG. 2K).

In any event, rather than enter a full statement to plot a bubble chart, such as "Plot a bubble chart with the x-axis Pclass, the y-axis Fare, the bubble color Gender, the bubble size Age, and sibling by Survived" (which reference data concerning the titanic.csv dataset as noted above), user 16 may enter a generic command to "Plot a bubble chart" to reveal the configurator having a graphical representation 350 of a format for a bubble chart.

Graphical representation 350 may include one or more aspects for the format for visually representing multi-dimensional data 25 as a bubble chart. With respect to the example of graphical representation 350, the one or more aspects are denoted as an x-axis 351A, a y-axis 351B, a color 351C, a size 351D, and a slider 351E (which may collectively be referred to as "aspects 351"). User 16 may select one of aspects 351, such as x-axis 351A, which may result in user interface 321A receiving the selection of x-axis 351A of graphical representation 350 of the format for visually representing multi-dimensional data 25 as a bubble chart.

Responsive to receiving the selection of x-axis 351A (or any other aspect 351) of graphical representation 350, user interface 321A may present various options by which user 16 may select a dimension of multi-dimensional data 25 to associate with x-axis 351A. In the full statement noted above to produce a fully formed bubble chart, x-axis 351A should be associated with a dimension of multi-dimensional data 25 denoted as "Pclass." An example of selecting the dimension of multi-dimensional data 25 to associate with x-axis 351A is described in more detail with respect to the example of FIG. 3B.

Figure 3B:
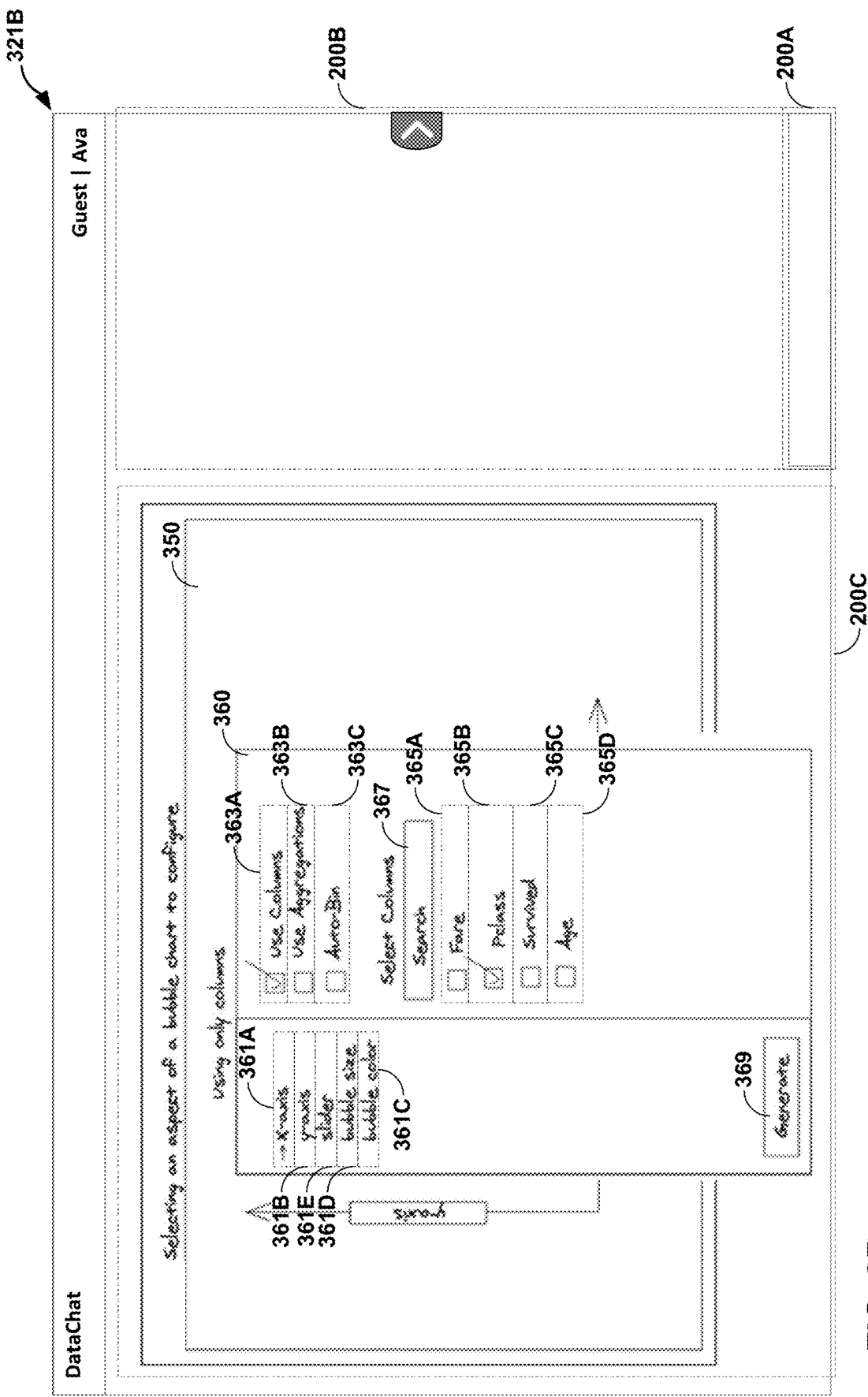

In the example of FIG. 3B, a user interface 321B may represent one example of user interface 21 shown in the example of FIG. 1. User interface 321B may be similar to user interface 321A in that user interface 321B includes frames 200, but differs in that graphical dialog frame 200C presents a pop-up box 360 over graphical representation 350 responsive to receiving the selection of x-axis 351A. Pop-up box 360 represents one example of a way by which to present options for selecting a dimension of multi-dimensional data 25. The techniques described in this disclosure, however, should not be limited to pop-up boxes, but may include any way by which to select a dimension including a drop down list associated with each of aspects 351, a left-click menu based system which presents a list similar to pop-up box 360, or any other interaction commonly employed by configurators or other graphical configuration assistants.

Pop-up box 360 may automatically select x-axis option 361A responsive to user 16 selecting x-axis 351A, and present scope options 363A-363C along with scope-specific options 365A-365D. Pop-up box 360 also includes y-axis option 361B, bubble color option 361C, bubble size option 361D, and slider option 361E, which correspond to respective aspects 351B-351E respectively.

Scope options 363A-363C may enable user 16 to select a scope for selecting the dimension of multi-dimensional data 25. Scope option 363A may enable user 16 to select a column as the dimension, while scope option 363B may enable user 16 to select an aggregation of one or more columns that results in a new dimension added to multi-dimensional data 25 that is then associated with x-axis 351A. Scope option 363B may enable user 16 to auto-bin one or more columns of multi-dimensional data 25 to create a new dimension that is then associated with x-axis 351A similar to scope option 363B.

Scope-specific options 365A-365D may enable a user to specify options specific to each of scope options 363A-363C. In the example of FIG. 3B, scope-specific options 365A-365D are specific to scope option 363A (i.e., using columns in this example). Scope-specific option 365A-365D each reference a different column of multi-dimensional data 25 (i.e., columns entitled respectively "Fare," "Pclass"—which is selected, "Survived," and "Age"). Pop-up box 360 also includes a search option 367 that enables user 16 to search for a column of multi-dimensional data 25 as scope-specific options 365A-365D may only represent a sub-set of the columns of multi-dimensional data 25 selected based on analytics associated with user 16 (meaning a user profile and past history of use by user 16 of chatbot 10) and potentially other users of chatbot 10 in the same organization or across organizations.

Pop-up box 360 also includes a generate indication 369 that enables user 16 to generate a preview of the bubble chart for multi-dimensional data 25 that is configured according to the association between various aspects 351 and dimensions of multi-dimensional data 25. In some example, generate indication 369 remains inactive until all aspects 351 have been associated with a dimension of multi-dimensional data 25. Selection of generate indication 369 and the response by user interface 21 to selection of generate indication 369 is described below in more detail below with respect to the example of FIG. 3D.

Figure 3C:
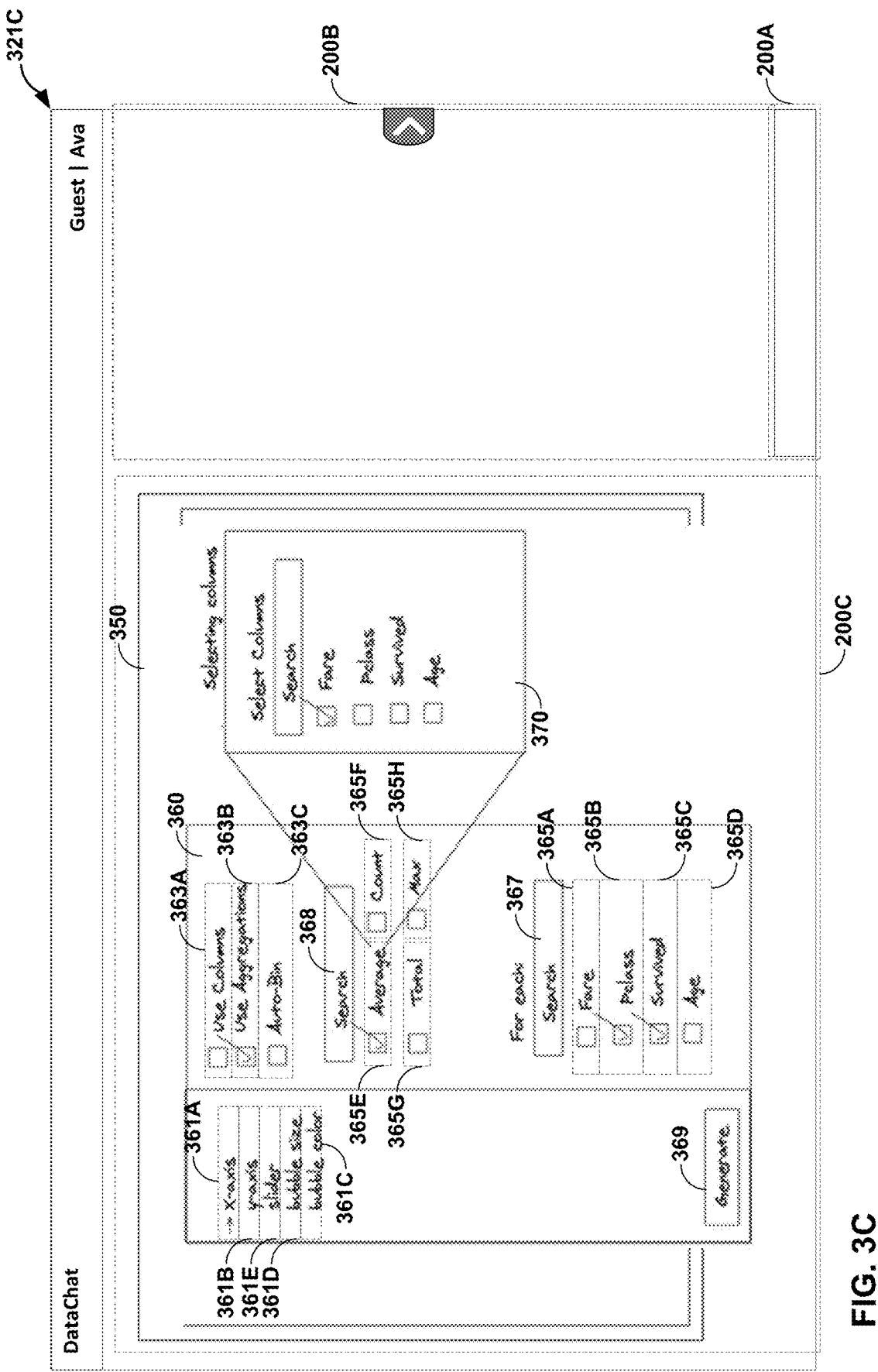
Figure 3D:
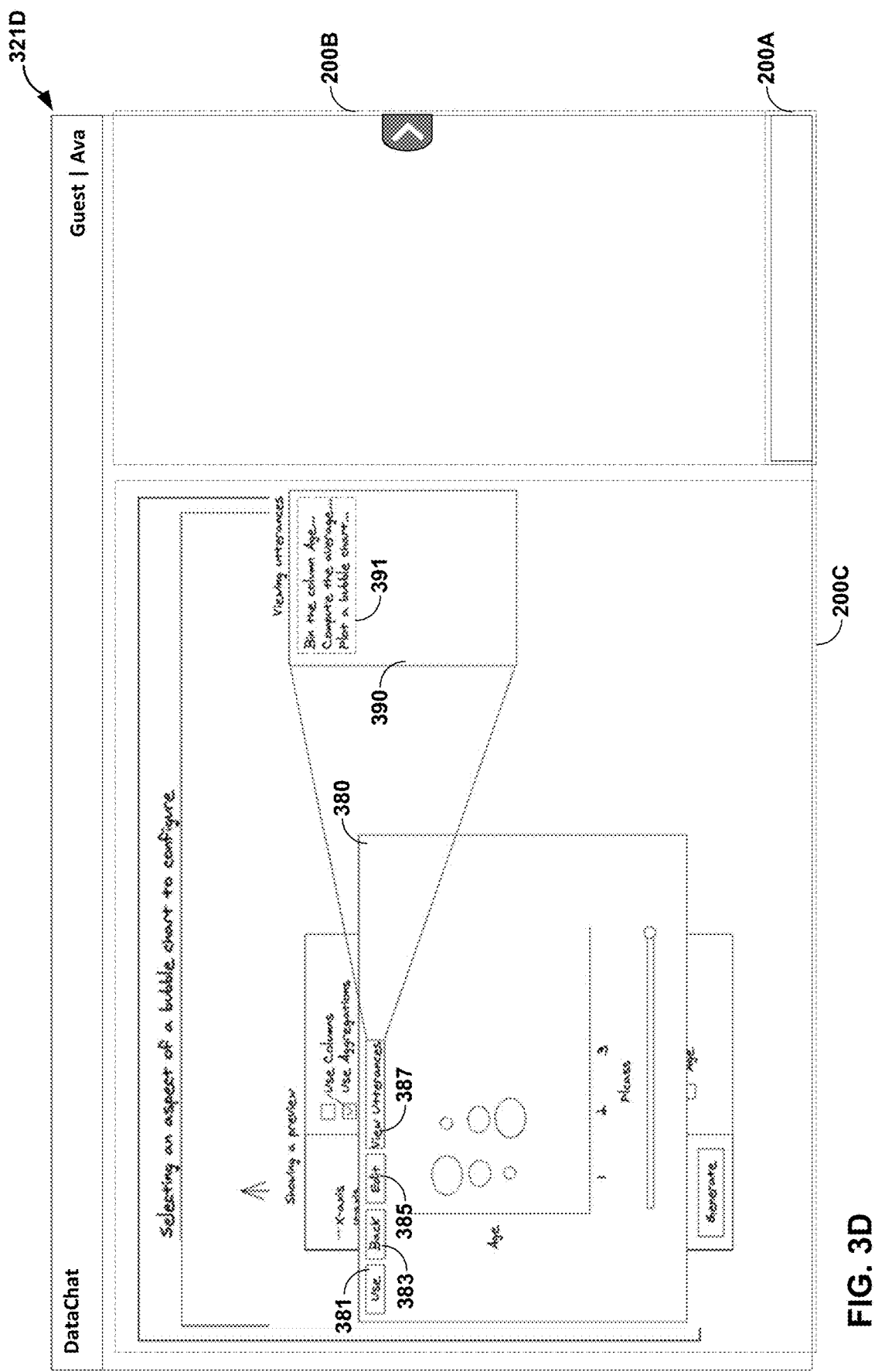

Before considering the example of FIG. 3D, user 16 may instead select to scope option 363B, which enables user 16 to "Use Aggregation." In the example of FIG. 3C, a user interface 321C may represent an example of user interface 21 after user 16 has selected scope option 363B. Responsive to receiving the selection of scope option 363B, pop-up box 360 may present sub-scope options 365E-365H associated with scope option 363B along with another search option 368, which may perform similar search functions to those described above with respect to search option 367 except that search option 368 searches for types of aggregation not pre-populated in pop-up window 360 as scope-specific options 365E-365H.

Scope-specific options 365E-365H may enable user 16 to perform aggregation in terms of, respectively, an average, a count, a total, and a max. Responsive to selecting any of scope-specific options 365, user interface 321C may present pop-up box 370, which may allow user 16 to select one or more pre-populated columns and/or search for additional columns over which to perform the particular type of aggregations associated with scope-specific options 365E-365H.

Although not shown in the example of FIGS. 3A-3E, user 16 may also select scope option 363C, which performs auto-bin operations. When user 16 selects scope option 363C, pop-up box 360 may provide scope-specific options to select a column and select the number of bins into which user 16 wants to separate the values of the selected column.

Referring next to the example of FIG. 3D, a user interface 321D may represent yet another example of user interface 21, which is similar to user interface 321B, except that user 16 has selected generate indication 369. Responsive to receiving the selection of generate indication 369, user interface 321D may generate and present bubble chart preview 380. In generating bubble chart preview 380, user interface 321D may confirm that the association of the dimension to the aspect is compatible. When the association of the dimension to the aspect is not compatible, user interface 321D may present an indication that the association of the dimension to the aspect is not compatible, and an option to correct the association of the dimension to the aspect (which is not shown in the example of FIG. 3D for ease of illustration).

When the association of the dimension to the aspect is compatible, user interface 321D may present bubble chart preview 380 (which may represent one example of a visual representation preview 380) that provides a visual representation preview of multi-dimensional data 25. Bubble chart preview 380 may include a use option 381, a back option 383, an edit option 385, and a view utterance option 387. Use option 381 may enable user 16 to proceed to generate a bubble chart based on the associations entered via one or more of user interfaces 321A-321C described above with respect to the examples of FIGS. 3A-3C.

Back option 385 may enable user 16 to return to one or more of user interfaces 321A-321C (which may dispose of any changes made in bubble chart preview 380). Edit option 385 may enable user 16 to edit bubble chart preview 380 (e.g., by changing a title, color, text, and/or descriptors associated with bubble chart preview 380).

View utterances option 387 may enable user 16 to view data indicative of a current input (or sequence of current inputs 319) that would have resulted in generation of the bubble chart shown in bubble chart preview 380 for visualizing multi-dimensional data 25. In the example of FIG. 3D, user 16 has selected view utterances option 387, which resulted in user interface 321D generating inputs 391 that would have, when entered by user 16, associated the dimension to the aspect to generate the bubble chart shown in bubble chart preview and presenting pop-up box 390 that shows the generated inputs 391. In this respect, user 16 may learn the logical, more formal natural language utterances over time that may be entered to create, via first frame 200A, the bubble chart (while also helping user 16 to understand the more formal structure for defining many visual representations of multi-dimensional data 25).

Assuming user 16 has confirmed that bubble chart preview 380 meets various criteria, user 16 may select use option 381. Responsive to selecting use option 381, user interface 321D may automatically enter inputs 391, populating dialogue frame 200B with the utterances and presenting a bubble chart that mirrors the bubble chart presented in bubble chart preview 380. As such, again, user 16 may understand and review, via dialogue frame 200B and graphical log frame 200C, how the bubble chart was created. User interface 321D may also present at least a portion of the multi-dimensional data 25 (e.g., in table form) in addition to the visual representation of multi-dimensional data 25.

Figure 3E:
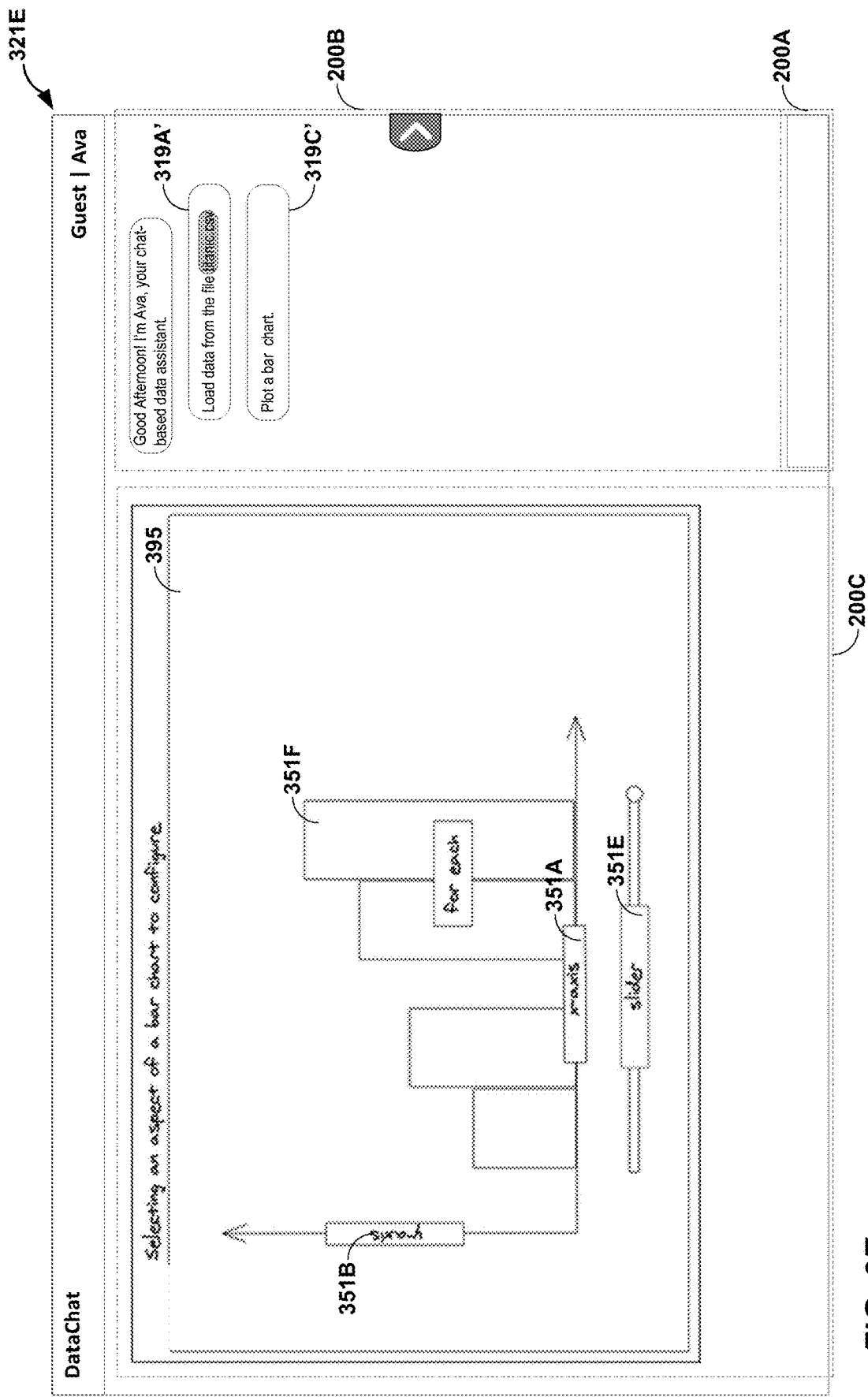

In the example of FIG. 3E, a user interface 321E represents an example of user interface 21 shown in the example of FIG. 1 in which user 16 entered a different previous input 319C' (compared to previous input 319B' shown in the example of FIG. 3A) to "Plot a bar chart." User interface 321E may, responsive to receiving previous input 319B', present graphical representation 395 of a format for a bar chart that provides a visual representation of multi-dimensional data 25 (as set forth in the titanic.csv per previous input 319A'). Graphical representation 395 has overlapping aspects 351A, 351B, and 351F with the same aspects of graphical representation 350. Graphical representation 395 also has an aspect "bar" 351F that enables user 16 to configure a color, dimension, size, and other aspects of each bar. User 16 may proceed as discussed above to associate aspects to dimensions, generate a preview, and use the preview to generate a bar chart.

Figure 4:
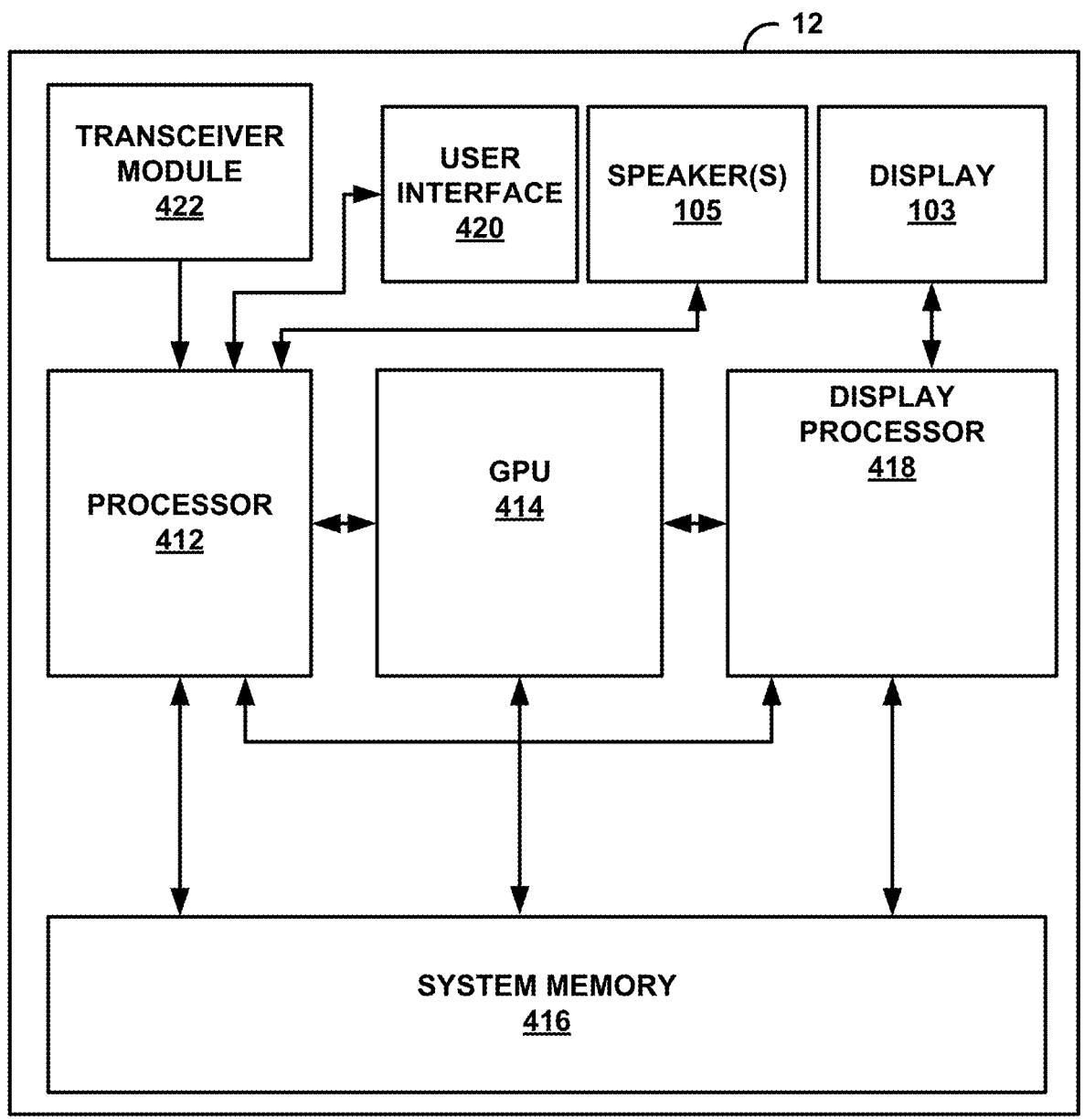
FIG. 4 is a block diagram illustrating example components of the client device shown in the example of FIG. 1.

FIG. 4 is a block diagram illustrating example components of the client device 14 shown in the example of FIG. 1. In the example of FIG. 4, the device 14 includes a processor 412, a graphics processing unit (GPU) 414, system memory 416, a display processor 418, one or more integrated speakers 105, a display 103, a user interface 420, and a transceiver module 422. In examples where the client device 14 is a mobile device, the display processor 418 is a mobile display processor (MDP). In some examples, such as examples where the client device 14 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the client device 14 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the client device 14. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications. Examples of the applications include web browsers, e-mail applications, spreadsheets, video games, other applications that generate viewable objects for display, or any of the application types listed in more detail above. The system memory 416 may store instructions for execution of the applications. The execution of one of the applications 20 on the processor 412 causes the processor 412 to produce graphics data for image content that is to be displayed and the audio data that is to be played. The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL'; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the client device 14 and moved to another device. As another example, memory, substantially similar to the system memory 416, may be inserted into the client devices 14. In certain examples, a non-transitory storage medium may store data that can, over time, change (e.g., in RAM).

The user interface 420 may represent one or more hardware or virtual (meaning a combination of hardware and software) user interfaces by which a user may interface with the client device 14. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the various units/modules/etc. The transceiver module 422 may represent a unit configured to establish and maintain the wireless connection between the devices 12/14. The transceiver module 422 may represent one or more receivers and one or more transmitters capable of wireless communication in accordance with one or more wireless communication protocols.

Figure 5:
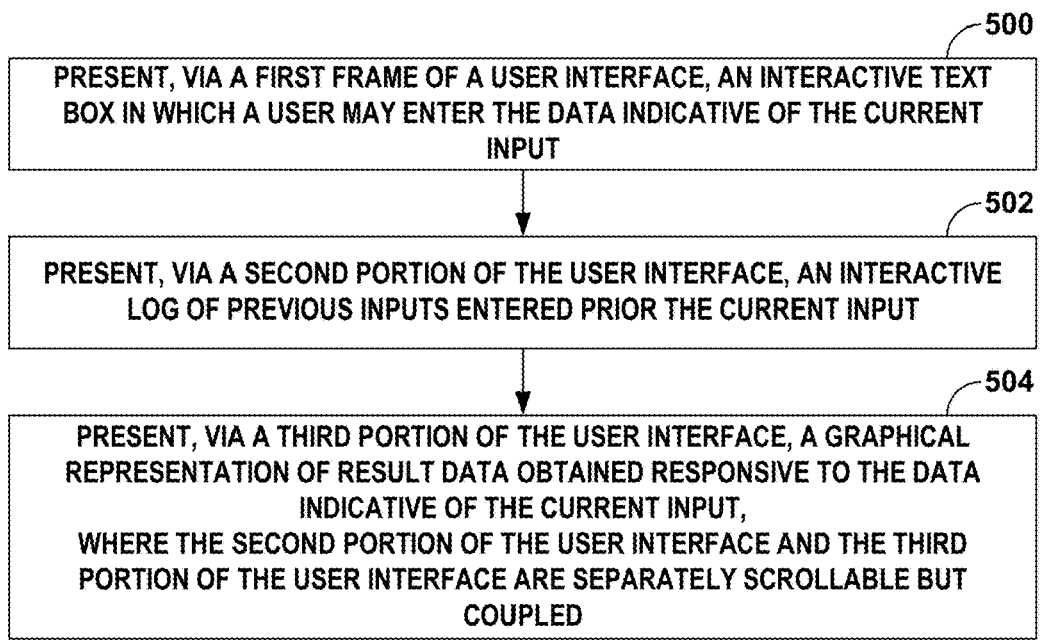
FIG. 5 is a flowchart illustrating example operation of the system of FIG. 1 in performing various aspects of the techniques described in this disclosure to enable more cohesive user interfaces for data analytic systems.

FIG. 5 is a flowchart illustrating example operation of the system of FIG. 1 in performing various aspects of the techniques described in this disclosure to enable more cohesive user interfaces for data analytic systems. Initially, client 30 may present, via the first frame (or other portion) of user interface 21, an interactive text box in which user 16 may enter data representative of a current input (which may be referred to as the "current input 19" for ease of explanation) (500). The interactive text box may provide suggestions (via, as one example) an expanding suggestion pane that extends above the interactive text box to facilitate user 16 in entering current input 19).

Client 30 may present, via the second frame (or other portion) of user interface 21, an interactive log of previous inputs (which may be denoted as "previous inputs 19'") entered prior current input 19 (502). The first frame and second frame of user interface 21 may accommodate user 16 when user 16 represents a user having left-brained predominance, as the first frame and second frame of user interface 21 provide a more logical defined capability with expressing natural language utterances that directly generate results 25 using keywords and other syntax to which predominantly left-brain users predominantly relate.

Client 30 may further present, via the third frame of user interface 21, a graphical representation of result data 25 obtained responsive to current input 19, where the second portion of user interface 21 and the third portion of user interface 21 are separately scrollable but coupled as described in more detail above (504). This third frame of user interface 21 may accommodate user 16 when user 16 represents a user having right-brained predominance, as the third frame of user interface 21 provides a more graphical/visual/artistic capability with expressing results 25 using visual representations of results 25 (e.g., charts, graphs, plots, etc.) that may represent multi-dimensional data (which may also be referred to as "multi-dimensional datasets" and as such may be referred to as "multi-dimensional data 25" or "multi-dimensional datasets 25").

In this respect, various aspect of the techniques described in this disclosure may facilitate better interactions with respect to performing data analytics while also removing clutter and other distractions that may distract from understanding results 25 provided by data analytic systems, such as data analytic system 10. As a result, data analytic system 10 may operate more efficiently, as users 16 are able to more quickly understand results 25 without having to enter additional inputs and/or perform additional interactions with data analytic system 10 to understand presented results 25. By potentially reducing such inputs and/or interactions, data analytic system 10 may conserve various computing resources (e.g., processing cycles, memory space, memory bandwidth, etc.) along with power consumption consumed by such computing resources, thereby improving operation of data analytic systems themselves.

Figure 6:
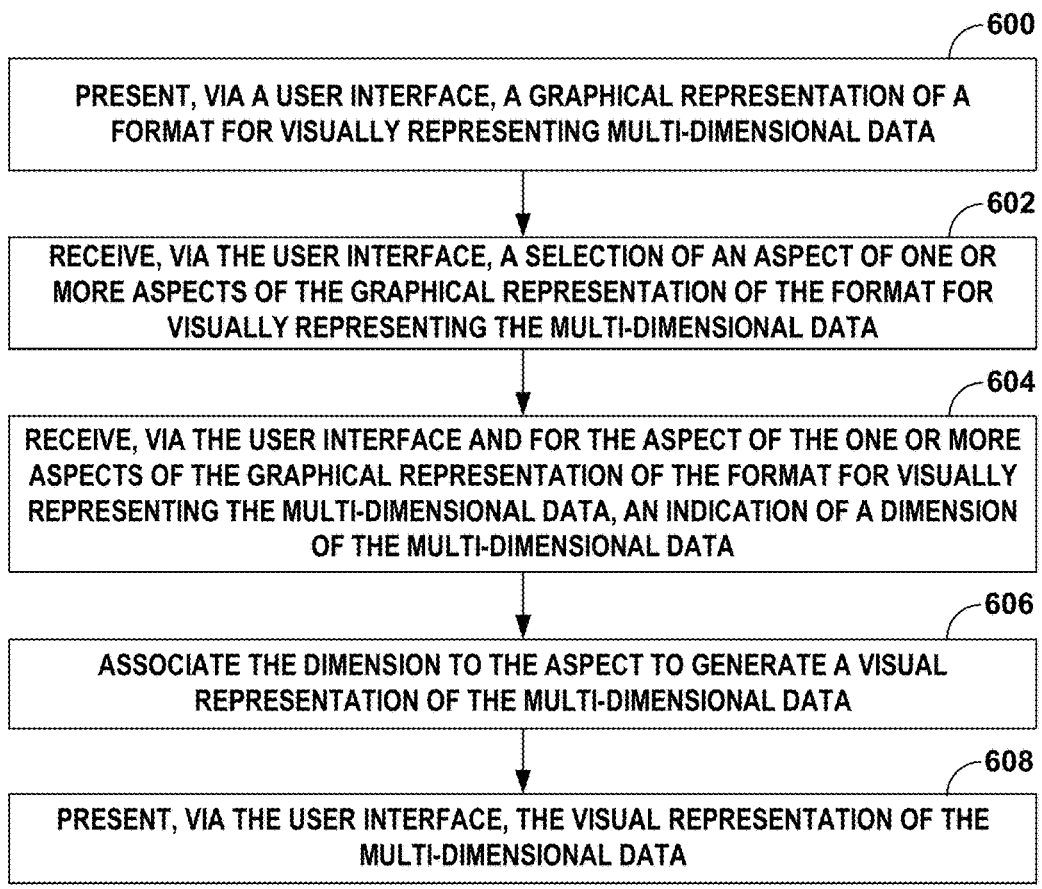
FIG. 6 is a flowchart illustrating another example operation of the system of FIG. 1 in performing various aspects of the techniques described in this disclosure to enable more cohesive user interfaces for data analytic systems.

FIG. 6 is a flowchart illustrating another example operation of the system of FIG. 1 in performing various aspects of the techniques described in this disclosure to enable more cohesive user interfaces for data analytic systems. Initially, client 30 may present, via user interface 21 (which may include the three frames discussed throughout this disclosure), a graphical representation of a format for visually representing multi-dimensional data 25 (600). The format may change based on the particular visual representation of multi-dimensional data 25. For example, a bubble plot may include an x-axis, a y-axis, a bubble color, a bubble size, a slider, etc. As another example, a bar chart may include an x-axis, a y-axis, a bar color, a bar size, a slider, etc. In any event, the graphical representation may present a generic representation of a type of visual representation of multi-dimensional data 25, such as a generic bubble plot, a generic bar chart, or a generic graphical representation of any type of visual representation of multi-dimensional data 25.

User 21 may then interact with this general graphical representation of the visual representation of multi-dimensional data 25 to select one or more aspects (which may be another way to refer to the x-axis, y-axis, bubble color, bubble size, slider, or any other aspect of the particular type of visual representation of multi-dimensional data 25 that user 16 previously selected). As such, client 30 may receive, via user interface 21, the selection of an aspect of one or more aspects of the graphical representation of the format for visually representing multi-dimensional data 25 (602).

After selecting the aspect, user 91 may interface with client 30, via user interface 21, to select a dimension of multi-dimensional data 25 that should be associated with the selected aspect. Client 30 may then receive, via user interface 30 and for the aspect of the one or more aspects of the graphical representation of the format for visually representing multi-dimensional data 25, an indication of the dimension of the one or more dimensions of multi-dimensional data 25 (604).

Client 30 may next associate the dimension to the aspect to generate a visual representation of multi-dimensional data 25 (e.g., in the form of a bar chart, a line chart, an area chart, a gauge, a radar chart, a bubble plot, a scatter plot, a graph, a pie chart, a density map, a Gantt Chart, and a treemap. or any other type of plot, chart, graph or other visual representation) (606). Client 30 may proceed to present, via user interface 21, the visual representation of multi-dimensional data 25 (608).

As such, various aspects of the techniques described in this disclosure may facilitate generation of visual representations of multi-dimensional data 25 via graphical representations of the format for such visual representations, which may enable more visual (e.g., right-brain predominant) users to create complicated visual representations of the multi-dimensional data that would otherwise be difficult and time consuming (e.g., due to unfamiliarity with natural language utterances required to generate the visual representations). By reducing interactions while also explaining the corresponding natural language input along side the visual representation of mulit-dimensional data 25, data analytics system 10 may again operate more efficiently, as users 16 are able to more quickly understand results 25 without having to enter additional inputs and/or perform additional interactions with data analytic system 10 in an attempt to visualize multi-dimensional data 25 (which may also be referred to as a "result 25"). By potentially reducing such inputs and/or interactions, data analytic system 10 may conserve various computing resources (e.g., processing cycles, memory space, memory bandwidth, etc.) along with power consumption consumed by such computing resources, thereby improving operation of data analytic systems themselves.

In this way, various aspects of the techniques may enable the following clauses:

Clause 1A. A device configured to process data indicative of a current input, the device comprising: one or more processors configured to: present, via a first portion of a user interface, an interactive text box in which a user may enter the data indicative of the current input; present, via a second portion of the user interface, an interactive log of previous inputs entered prior the current input; and present, via a third portion of the user interface, a graphical representation of result data obtained responsive to the data indicative of the current input, wherein the second portion of the user interface and the third portion of the user interface are separately scrollable but coupled such that interactions in either the second portion of the user interface or the third portion of the user interface synchronize the second portion of the user interface and the third portion of the user interface; and a memory configured to store the data indicative of the current input.

Clause 2A. The device of clause 1A, wherein the one or more processors are further configured to: present, via the user interface, a full-screen indication that allows a user to transition the user interface into a full-screen mode; transition, responsive to receiving an indication that the full-screen indication has been selected by the user, the user interface into the full-screen mode in which the second portion of the user interface is minimized and the third portion of the user interface resides above the first portion of the user interface.

Clause 3A. The device of any combination of clauses 1A and 2A, wherein the user interface, when in the full-screen mode, presents an expose indication by which to display the second portion of the user interface, and wherein the one or more processors are further configured to expose, responsive to selection of the expose indication, the second portion of the user interface such that the second portion of the user interface at least partially overlaps the third portion of the user interface.

Clause 4A. The device of any combination of clauses 1A-3A, wherein the one or more processors are further configured to: detect a type of device on which the user interface is displayed; transition, responsive to the type of device detected, the user interface into a full-screen mode in which the second portion of the user interface is minimized and the third portion of the user interface resides above the first portion of the user interface.

Clause 5A. The device of any combination of clauses 1A-4A, wherein the second portion of the user interface is located above the first portion of the user interface, and wherein the first portion of the user interface and the second portion of the user interface is located along a right boundary of the third portion of the user interface.

Clause 6A. The device of any combination of clauses 1A-5A, wherein the interactive text box automatically performs an autocomplete operation to facilitate entry of the data indicative of the current input.

Clause 7A. The device of clause 5A, wherein the interactive text box also automatically highlights portions of the data indicative of the current input that references named aspects of a database to which the current input is directed.

Clause 8A. The device of clause 5A, wherein the interactive text box limits a number of recommendations suggested during the autocomplete operation to a threshold number of recommendations.

Clause 9A. The device of any combination of clauses 1A-8A, wherein the interactive text box includes a cancel indication that enables the user to cancel processing of the data indicative of the current input, and wherein the one or more processors are further configured to cancel, responsive to selection of the cancel indication, processing of the data indicative of the current input.

Clause 10A. A method of processing data indicative of a current input, the method comprising: presenting, via a first portion of a user interface, an interactive text box in which a user may enter the data indicative of the current input; presenting, via a second portion of the user interface, an interactive log of previous inputs entered prior the current input; and presenting, via a third portion of the user interface, a graphical representation of result data obtained responsive to the data indicative of the current input, wherein the second portion of the user interface and the third portion of the user interface are separately scrollable but coupled such that interactions in either the second portion of the user interface or the third portion of the user interface synchronize the second portion of the user interface and the third portion of the user interface.

Clause 11A. The method of clause 10A, further comprising: presenting, via the user interface, a full-screen indication that allows a user to transition the user interface into a full-screen mode; and transitioning, responsive to receiving an indication that the full-screen indication has been selected by the user, the user interface into the full-screen mode in which the second portion of the user interface is minimized and the third portion of the user interface resides above the first portion of the user interface.

Clause 12A. The method of any combination of clauses 10A and 11A, wherein the user interface, when in the full-screen mode, presents an expose indication by which to display the second portion of the user interface, and wherein the method further comprises exposing, responsive to selection of the expose indication, the second portion of the user interface such that the second portion of the user interface at least partially overlaps the third portion of the user interface.

Clause 13A. The method of any combination of clauses 10A-12A, further comprising: detecting a type of device on which the user interface is displayed; transitioning, responsive to the type of device detected, the user interface into a full-screen mode in which the second portion of the user interface is minimized and the third portion of the user interface resides above the first portion of the user interface.

Clause 14A. The method of any combination of clauses 10A-13A, wherein the second portion of the user interface is located above the first portion of the user interface, and wherein the first portion of the user interface and the second portion of the user interface is located along a right boundary of the third portion of the user interface.

Clause 15A. The method of any combination of clauses 1A-14A, wherein the interactive text box automatically performs an autocomplete operation to facilitate entry of the data indicative of the current input.

Clause 16A. The method of clause 15A, wherein the interactive text box also automatically highlights portions of the data indicative of the current input that references named aspects of a database to which the current input is directed.

Clause 17A. The method of clause 15A, wherein the interactive text box limits a number of recommendations suggested during the autocomplete operation to a threshold number of recommendations.

Clause 18A. The method of any combination of clauses 10A-17A, wherein the interactive text box includes a cancel indication that enables the user to cancel processing of the data indicative of the current input, and wherein the method further comprises canceling, responsive to selection of the cancel indication, processing of the data indicative of the current input.

Clause 19A. A non-transitory computer-readable storage medium having instructions stored thereon that, when executed, cause one or more processors to: present, via a first portion of a user interface, an interactive text box in which a user may enter the data indicative of the current input; present, via a second portion of the user interface, an interactive log of previous inputs entered prior the current input; and present, via a third portion of the user interface, a graphical representation of result data obtained responsive to the data indicative of the current input, wherein the second portion of the user interface and the third portion of the user interface are separately scrollable but coupled such that interactions in either the second portion of the user interface or the third portion of the user interface synchronize the second portion of the user interface and the third portion of the user interface.

Clause 1B. A device configured to perform data analytics, the device comprising: a memory configured to store multi-dimensional data; and one or more processors configured to: present, via a user interface, a graphical representation of a format for visually representing the multi-dimensional data; receive, via the user interface, a selection of an aspect of one or more aspects of the graphical representation of the format for visually representing the multi-dimensional data; receive, via the user interface and for the aspect of the one or more aspects of the graphical representation of the format for visually representing the multi-dimensional data, an indication of a dimension of the multi-dimensional data; associate the dimension to the aspect to generate a visual representation of the multi-dimensional data; and present, via the user interface, the visual representation of the multi-dimensional data.

Clause 2B. The device of clause 1B, wherein the one or more processors are configured to, when configured to associate the dimension to the aspect, generate data indicative of an input that would have, when entered by a user, associated the dimension to the aspect to generate the visual representation of the multi-dimensional data; and wherein the one or more processors are further configured to present, via the user interface, the data indicative of the input.

Clause 3B. The device of any combination of clauses 1B and 2B, wherein the one or more processors are further configured to process the dimension of the multi-dimensional data to create a new dimension of the multi-dimensional data, and wherein the one or more processors are configured to, when configured to associate the dimension to the aspect, associate the new dimension to the aspect to generate the visual representation of the multi-dimensional data.

Clause 4B. The device of any combination of clauses 1B-3B, wherein the one or more processors are configured to, when configured to associate the dimension to the aspect: confirm that the association of the dimension to the aspect is compatible; and present, via the user interface and when the association of the dimension to the aspect is compatible, a preview of the visual representation of the multi-dimensional data.

Clause 5B. The device of clause 4B, wherein the one or more processors are configured to, when configured to associate the dimension to the aspect, present, via the user interface and when the association of the dimension to the aspect is not compatible, an indication that the association of the dimension to the aspect is not compatible, and an option to correct the association of the dimension to the aspect.

Clause 6B. The device of any combination of clauses 4B and 5B, wherein the one or more processors are configured to, when configured to present the preview of the visual representation of the multi-dimensional data, present an option to edit the visual representation of the multi-dimensional data.

Clause 7B. The device of clause 6B, wherein the one or more processors are configured to, when configured to present the option to edit the visual representation of the multi-dimensional data, present the option to edit one or more of a color, a title, text, and descriptors associated with the visual representation of the multi-dimensional data.

Clause 8B. The device of any combination of clauses 1B-7B, wherein the one or more processors are further configured to present, via the user interface, at least a portion of the multi-dimensional data in addition to the visual representation of the multi-dimensional data.

Clause 9B. The device of any combination of clauses 1B-8B, wherein the visual representation of the multi-dimensional data includes a bar chart, a line chart, an area chart, a gauge, a radar chart, a bubble plot, a scatter plot, a graph, a pie chart, a density map, a Gantt Chart, and a treemap.

Clause 10B. A method of performing data analytics, the method comprising: presenting, via a user interface, a graphical representation of a format for visually representing multi-dimensional data; receiving, via the user interface, a selection of an aspect of one or more aspects of the graphical representation of the format for visually representing the multi-dimensional data; receiving, via the user interface and for the aspect of the one or more aspects of the graphical representation of the format for visually representing the multi-dimensional data, an indication of a dimension of the multi-dimensional data; associating the dimension to the aspect to generate a visual representation of the multi-dimensional data; and presenting, via the user interface, the visual representation of the multi-dimensional data.

Clause 11B. The method of clause 10B, wherein associating the dimension to the aspect comprises generating data indicative of an input that would have, when entered by a user, associated the dimension to the aspect to generate the visual representation of the multi-dimensional data; and wherein the method further comprises presenting, via the user interface, the data indicative of the input.

Clause 12B. The method of any combination of clauses 10B and 11B, further comprising processing the dimension of the multi-dimensional data to create a new dimension of the multi-dimensional data, wherein associating the dimension to the aspect comprises associating the new dimension to the aspect to generate the visual representation of the multi-dimensional data.

Clause 13B. The method of any combination of clauses 10B-12B, wherein associating the dimension to the aspect comprises: confirming that the association of the dimension to the aspect is compatible; and presenting, via the user interface and when the association of the dimension to the aspect is compatible, a preview of the visual representation of the multi-dimensional data.

Clause 14B. The method of clause 13B, wherein associating the dimension to the aspect comprises presenting, via the user interface and when the association of the dimension to the aspect is not compatible, an indication that the association of the dimension to the aspect is not compatible, and an option to correct the association of the dimension to the aspect.

Clause 15B. The method of any combination of clauses 13B and 14B, wherein presenting the preview of the visual representation of the multi-dimensional data comprises presenting an option to edit the visual representation of the multi-dimensional data.

Clause 16B. The method of clause 15B, wherein presenting the option to edit the visual representation of the multi-dimensional data comprises presenting the option to edit one or more of a color, a title, text, and descriptors associated with the visual representation of the multi-dimensional data.

Clause 17B. The method of any combination of clauses 10B-16B, further comprising presenting, via the user interface, at least a portion of the multi-dimensional data in addition to the visual representation of the multi-dimensional data.

Clause 18B. The method of any combination of clauses 10B-17B, wherein the visual representation of the multi-dimensional data includes a bar chart, a line chart, an area chart, a gauge, a radar chart, a bubble plot, a scatter plot, a graph, a pie chart, a density map, a Gantt Chart, and a treemap.

Clause 19B. A non-transitory computer-readable storage medium having instructions stored thereon that, when executed, cause one or more processors to: present, via a user interface, a graphical representation of a format for visually representing multi-dimensional data; receive, via the user interface, a selection of an aspect of one or more aspects of the graphical representation of the format for visually representing the multi-dimensional data; receive, via the user interface and for the aspect of the one or more aspects of the graphical representation of the format for visually representing the multi-dimensional data, an indication of a dimension of the multi-dimensional data; associate the dimension to the aspect to generate a visual representation of the multi-dimensional data; and present, via the user interface, the visual representation of the multi-dimensional data.

In each of the various instances described above, it should be understood that the devices 12/14 may perform a method or otherwise comprise means to perform each step of the method for which the devices 12/14 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the devices 12/14 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the client device 14 may perform a method or otherwise comprise means to perform each step of the method for which the client device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the client device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. A device configured to process data indicative of a current input, the device comprising:
one or more processors configured to:
present, via a first portion of a user interface, an interactive text box in which a user may enter the data indicative of the current input;
present, via a second portion of the user interface, an interactive log of previous inputs entered prior the current input; and
present, via a third portion of the user interface, a graphical representation of result data obtained responsive to the data indicative of the current input,
wherein the second portion of the user interface and the third portion of the user interface are separately scrollable but coupled such that interactions in either the second portion of the user interface or the third portion of the user interface synchronize the second portion of the user interface and the third portion of the user interface; and
a memory configured to store the data indicative of the current input.

2. The device of claim 1, wherein the one or more processors are further configured to:
present, via the user interface, a full-screen indication that allows a user to transition the user interface into a full-screen mode;
transition, responsive to receiving an indication that the full-screen indication has been selected by the user, the user interface into the full-screen mode in which the second portion of the user interface is minimized and the third portion of the user interface resides above the first portion of the user interface.

3. The device of claim 1,
wherein the user interface, when in the full-screen mode, presents an expose indication by which to display the second portion of the user interface, and
wherein the one or more processors are further configured to expose, responsive to selection of the expose indication, the second portion of the user interface such that the second portion of the user interface at least partially overlaps the third portion of the user interface.

4. The device of claim 1, wherein the one or more processors are further configured to:
detect a type of device on which the user interface is displayed;
transition, responsive to the type of device detected, the user interface into a full-screen mode in which the second portion of the user interface is minimized and the third portion of the user interface resides above the first portion of the user interface.

5. The device of claim 1,
wherein the second portion of the user interface is located above the first portion of the user interface, and
wherein the first portion of the user interface and the second portion of the user interface is located along a right boundary of the third portion of the user interface.

6. The device of claim 1, wherein the interactive text box automatically performs an autocomplete operation to facilitate entry of the data indicative of the current input.

7. The device of claim 6, wherein the interactive text box also automatically highlights portions of the data indicative of the current input that references named aspects of a database to which the current input is directed.

8. The device of claim 6, wherein the interactive text box limits a number of recommendations suggested during the autocomplete operation to a threshold number of recommendations.

9. The device of claim 1,
wherein the interactive text box includes a cancel indication that enables the user to cancel processing of the data indicative of the current input, and
wherein the one or more processors are further configured to cancel, responsive to selection of the cancel indication, processing of the data indicative of the current input.

10. A method of processing data indicative of a current input, the method comprising:
presenting, via a first portion of a user interface, an interactive text box in which a user may enter the data indicative of the current input;
presenting, via a second portion of the user interface, an interactive log of previous inputs entered prior the current input; and
presenting, via a third portion of the user interface, a graphical representation of result data obtained responsive to the data indicative of the current input,
wherein the second portion of the user interface and the third portion of the user interface are separately scrollable but coupled such that interactions in either the second portion of the user interface or the third portion of the user interface synchronize the second portion of the user interface and the third portion of the user interface.

11. The method of claim 10, further comprising:
presenting, via the user interface, a full-screen indication that allows a user to transition the user interface into a full-screen mode;
transitioning, responsive to receiving an indication that the full-screen indication has been selected by the user, the user interface into the full-screen mode in which the second portion of the user interface is minimized and the third portion of the user interface resides above the first portion of the user interface.

12. The method of claim 10,
wherein the user interface, when in the full-screen mode, presents an expose indication by which to display the second portion of the user interface, and
wherein the method further comprises exposing, responsive to selection of the expose indication, the second portion of the user interface such that the second portion of the user interface at least partially overlaps the third portion of the user interface.

13. The method of claim 10, further comprising:
detecting a type of device on which the user interface is displayed;
transitioning, responsive to the type of device detected, the user interface into a full-screen mode in which the second portion of the user interface is minimized and the third portion of the user interface resides above the first portion of the user interface.

14. The method of claim 10,
wherein the second portion of the user interface is located above the first portion of the user interface, and
wherein the first portion of the user interface and the second portion of the user interface is located along a right boundary of the third portion of the user interface.

15. The method of claim 10, wherein the interactive text box automatically performs an autocomplete operation to facilitate entry of the data indicative of the current input.

16. The method of claim 15, wherein the interactive text box also automatically highlights portions of the data indicative of the current input that references named aspects of a database to which the current input is directed.

17. The method of claim 15, wherein the interactive text box limits a number of recommendations suggested during the autocomplete operation to a threshold number of recommendations.

18. The method of claim 10,
wherein the interactive text box includes a cancel indication that enables the user to cancel processing of the data indicative of the current input, and
wherein the method further comprises canceling, responsive to selection of the cancel indication, processing of the data indicative of the current input.

19. A non-transitory computer-readable storage medium having instructions stored thereon that, when executed, cause one or more processors to:
present, via a first portion of a user interface, an interactive text box in which a user may enter the data indicative of the current input;
present, via a second portion of the user interface, an interactive log of previous inputs entered prior the current input; and
present, via a third portion of the user interface, a graphical representation of result data obtained responsive to the data indicative of the current input,
wherein the second portion of the user interface and the third portion of the user interface are separately scrollable but coupled such that interactions in either the second portion of the user interface or the third portion of the user interface synchronize the second portion of the user interface and the third portion of the user interface.

* * * * *